(12) United States Patent
Takao

(10) Patent No.: US 12,392,674 B2
(45) Date of Patent: Aug. 19, 2025

(54) TACTILE SENSOR

(71) Applicant: National University Corporation Kagawa University, Takamatsu (JP)

(72) Inventor: Hidekuni Takao, Takamatsu (JP)

(73) Assignee: National University Corporation Kagawa University, Takamatsu (JP)

( * ) Notice: Subject to any disclaimer, the term of this patent is extended or adjusted under 35 U.S.C. 154(b) by 244 days.

(21) Appl. No.: 18/030,471

(22) PCT Filed: Oct. 7, 2021

(86) PCT No.: PCT/JP2021/037128
§ 371 (c)(1),
(2) Date: Apr. 5, 2023

(87) PCT Pub. No.: WO2022/080223
PCT Pub. Date: Apr. 21, 2022

(65) Prior Publication Data
US 2023/0366762 A1 Nov. 16, 2023

(30) Foreign Application Priority Data
Oct. 14, 2020 (JP) ................................. 2020-172917

(51) Int. Cl.
*G01L 5/162* (2020.01)
(52) U.S. Cl.
CPC .................................... *G01L 5/162* (2013.01)
(58) Field of Classification Search
CPC ............ G01L 5/162; G01L 5/22; G01L 5/228
(Continued)

(56) References Cited

U.S. PATENT DOCUMENTS 4,709,342 A 11/1987 Hosoda
4,745,812 A 5/1988 Amazeen
(Continued)

FOREIGN PATENT DOCUMENTS

JP S60-034295 A 2/1985
JP 63-113326 A 5/1988
(Continued)

OTHER PUBLICATIONS

Kazuki Watatani et al., A Monolithic Fingerprint-like Tactile Sensor Array Realizaing High Resolution Imaging of Spatially Distributed Tactile Information, 2019 IEEE 32nd Int'l Conference on Micro Electro Mechanical Systems (MEMS), Jan. 27, 2019, pp. 182-185, Seoul, Korea.
(Continued)

*Primary Examiner* — Tran M. Tran
(74) *Attorney, Agent, or Firm* — Modal PLLC

(57) ABSTRACT

Provided is a tactile sensor that allows restraining a decrease in spatial resolution and sensitivity of a sensor element and has waterproof and dust-proof properties. A tactile sensor includes a sensor element and a casing that houses the sensor element. The sensor element includes: a base portion; a contact having a contact end; a support body that supports the contact in a displaceable manner with respect to the base portion; and a displacement detector that detects a displacement of the contact with respect to the base portion. The casing includes a film having flexibility that covers at least the contact end among the sensor element, and the contact end is secured to an inner surface of the film.

5 Claims, 23 Drawing Sheets

(58) Field of Classification Search
USPC ............................................................ 7/1.15
See application file for complete search history.

(56) References Cited

U.S. PATENT DOCUMENTS

| | | | | |
|---|---|---|---|---|
| 5,261,266 | A * | 11/1993 | Lorenz | .................... G01L 5/167 |
| | | | | 73/1.15 |
| 6,388,655 | B1 * | 5/2002 | Leung | .................... G06F 3/0338 |
| | | | | 345/157 |
| 6,888,074 | B2 * | 5/2005 | Haggstrom | ............ G01L 1/2218 |
| | | | | 73/862.622 |
| 7,777,721 | B2 * | 8/2010 | Kosu | .................... G06F 3/0312 |
| | | | | 345/157 |
| 7,778,694 | B2 * | 8/2010 | Kaga | .................... A61B 5/6814 |
| | | | | 600/475 |
| 7,882,746 | B2 * | 2/2011 | Bechtold | ............... F16C 29/046 |
| | | | | 73/856 |
| 8,297,124 | B2 * | 10/2012 | Watanabe | ............. G01L 9/0022 |
| | | | | 73/715 |
| 9,310,265 | B2 * | 4/2016 | Shimoyama | ............ G01L 5/228 |
| 9,535,086 | B2 * | 1/2017 | Beyeler | .................. G01Q 20/00 |
| 10,190,927 | B2 * | 1/2019 | Takao | ........................ G01L 1/18 |
| 10,576,626 | B2 * | 3/2020 | Rose | ........................ B25J 13/08 |
| 10,814,493 | B2 * | 10/2020 | Duchaine | ............. G01L 9/0051 |
| 11,513,102 | B2 * | 11/2022 | Shimoyama | ........... G01N 29/24 |
| 11,579,696 | B2 * | 2/2023 | Nicolet | .................... G01L 5/164 |
| 11,815,411 | B2 * | 11/2023 | Takao | .................... G01L 5/162 |
| 11,945,098 | B2 * | 4/2024 | Redmond | ............. G01N 19/02 |
| 2010/0064765 | A1 * | 3/2010 | Han | ......................... G01N 3/04 |
| | | | | 73/818 |
| 2010/0180697 | A1 | 7/2010 | Igarashi | |
| 2011/0083517 | A1 | 4/2011 | Muroyama et al. | |
| 2012/0202009 | A1 * | 8/2012 | Motofuji | ............... B29C 33/424 |
| | | | | 428/156 |
| 2015/0075250 | A1 * | 3/2015 | Kosa | ...................... G01L 25/00 |
| | | | | 73/862.041 |
| 2017/0067789 | A1 | 3/2017 | Takao | |
| 2024/0115343 | A1 * | 4/2024 | Takao | .................... A61B 17/29 |

FOREIGN PATENT DOCUMENTS

| | | |
|---|---|---|
| JP | S63-214631 A | 9/1988 |
| JP | H08-274573 A | 10/1996 |
| JP | 10-300594 A | 11/1998 |
| JP | 2000-019036 A | 1/2000 |
| JP | 2004-230532 A | 8/2004 |
| JP | 2007-010383 A | 1/2007 |
| JP | 2008-185399 A | 8/2008 |
| JP | 2011-085435 A | 4/2011 |
| JP | 2013-156095 A | 8/2013 |
| WO | 2015-133113 A1 | 9/2015 |

OTHER PUBLICATIONS

International Search Report in International Application PCT/JP2021/037128, dated Dec. 21, 2021, pp. 1-2, Japan Patent Office.

* cited by examiner

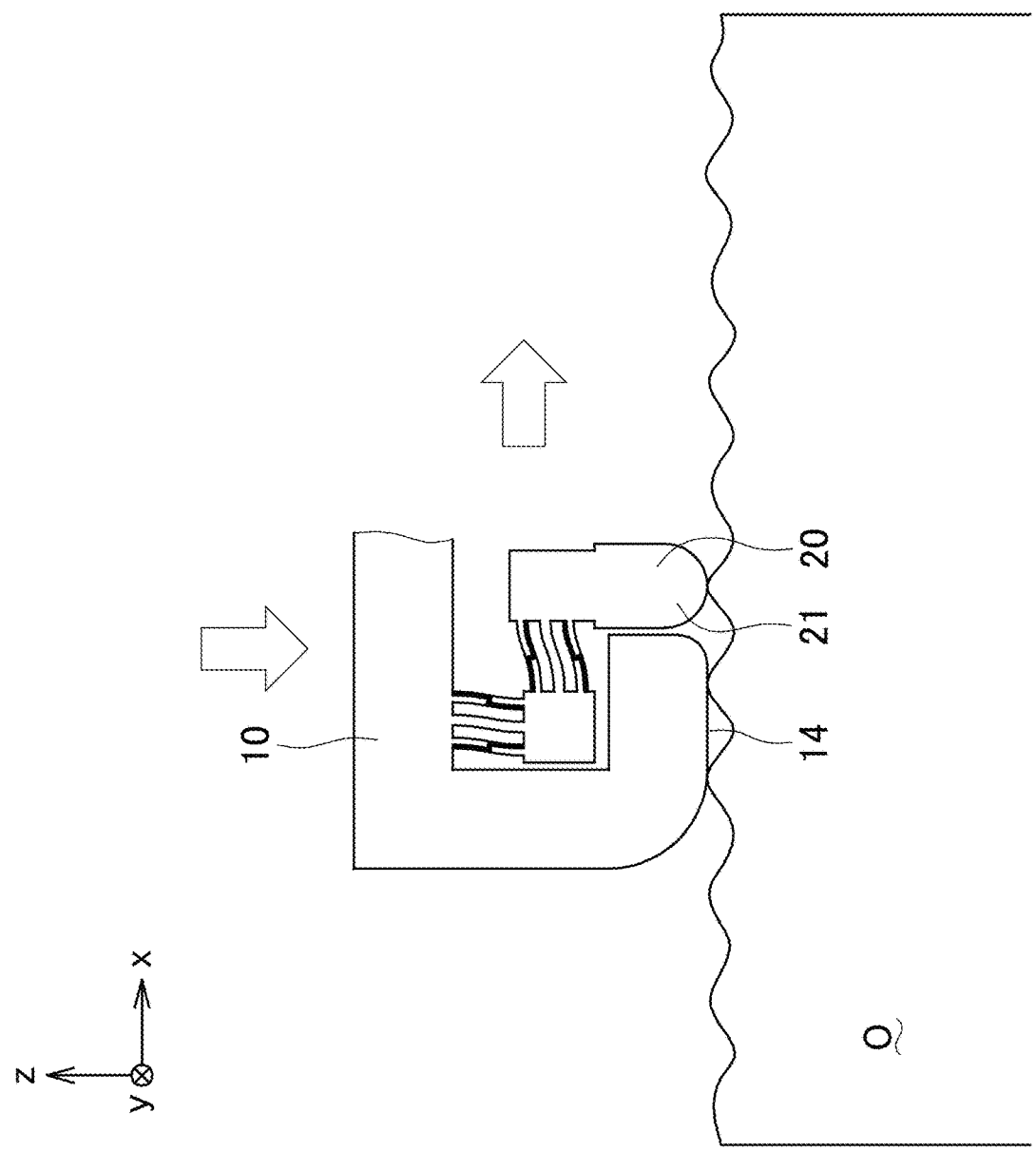

Photomicrograph of roughness standard piece

TACTILE SENSOR

TECHNICAL FIELD

The present invention relates to a tactile sensor. More specifically, the present invention relates to a tactile sensor for use to quantify a tactile sensation felt by a human.

BACKGROUND ART

It is said that a human fingertip can recognize fine ruggedness of about 100 μm and a minute force of about 100 μN. Having such a tactile sensation with high spatial resolution and high sensitivity allows a human to perceive texture and feel of a touched object. In the field of medicine, this tactile sensation is used to perform palpation in which doctors directly touch a diseased part with their fingers to diagnose a state of the diseased part. However, the palpation cannot be performed in endoscopic surgery or robotic surgery. Therefore, there is a need to attach a tactile sensor to an endoscope and the like to present tactile information in a body to doctors.

Various tactile sensors that simulate a human tactile sensation in an engineering manner have been developed. For example, WO 2015/133113 discloses a tactile sensor having a minute contact. The tactile sensor is slid while it is pressed against a measuring object, and a displacement of the contact is detected, and thus, fine ruggedness and a friction force in a minute region on a surface of the measuring object can be detected.

BRIEF SUMMARY

However, in the tactile sensor of WO 2015/133113, fine mechanical structure is exposed. When such a tactile sensor is brought into contact with organs in a body, blood gets into gaps in the mechanical structure and hardens, inhibiting the movement of the mechanical structure. The same applies when objects other than organs are measured. When dust accumulating on a surface of a measuring object gets into the gaps, the movement of the mechanical structure is inhibited. Liquids accumulating on the surface of the measuring object may cause a detection circuit to short-circuit. Therefore, in order to make a tactile sensor that can withstand practical use, it is necessary to protect the tactile sensor from liquids and dust.

JP-A-2011-85435 discloses a tactile sensor in which a sensor element is embedded inside a resin block. With such a configuration, the sensor element can be protected from liquids and dust. However, in a configuration in which the sensor element is embedded inside the resin block, a force received from a measuring object is dispersed by the resin block, thereby decreasing spatial resolution and sensitivity of the tactile sensor. Therefore, it is unsuitable for the purpose of obtaining tactile information substituting palpation.

In consideration of the above-described circumstance, the object of the present invention is to provide a tactile sensor that allows restraining a decrease in spatial resolution and sensitivity of a sensor element and has waterproof and dust-proof properties.

A tactile sensor of a first aspect includes a sensor element and a casing that houses the sensor element. The sensor element includes: a base portion; a contact having a contact end; a support body that supports the contact in a displaceable manner with respect to the base portion; and a displacement detector that detects a displacement of the contact with respect to the base portion. The casing includes a film having flexibility that covers at least the contact end among the sensor element, and the contact end is secured to an inner surface of the film.

In a tactile sensor of a second aspect, which is in the first aspect, the film has an adhesive layer on an inner surface, and the contact end is bonded to the film by the adhesive layer.

In a tactile sensor of a third aspect, which is in the first aspect or the second aspect, the contact end has a spike, and the spike bites into the film.

In a tactile sensor of a fourth aspect, which is in any of the first aspect to the third aspect, the casing further includes a casing main body having an opening, the opening is closed by the film, the contact end is arranged in the opening, and the base portion is secured with respect to the casing main body.

In a tactile sensor of a fifth aspect, which is in the fourth aspect, the casing main body includes: a frame having the opening, the film attached to an attaching surface on which the opening is positioned, and an exterior body that covers a portion of the film other than a portion corresponding to the opening.

In a tactile sensor of a sixth aspect, which is in the fifth aspect, the opening has an end portion in a sweep direction having a semi-elliptical or semicircular shape.

In a tactile sensor of a seventh aspect, which is in the fifth aspect or the sixth aspect, the frame has an inclined surface at an end portion thereof in a sweep direction.

With the first aspect, since the sensor element is housed in the casing, liquids and dust do not intrude into the sensor element. Therefore, the tactile sensor has waterproof and dust-proof properties. In addition, since the contact end is secured to the inner surface of the film, the contact moves following the movement of the film that directly comes into contact with a measuring object. Therefore, a decrease in spatial resolution and sensitivity of the sensor element can be restrained.

With the second aspect, since the contact end is bonded to the film, a force that the film receives from the measuring object is easily transmitted to the contact.

With the third aspect, since the contact end is secured to the film by the spike, the force that the film receives from the measuring object is easily transmitted to the contact.

With the fourth aspect, since the configuration is such that the film is disposed on the casing main body, securing the film is facilitated.

With the fifth aspect, since a part of the film is covered with the exterior body, an area where the film comes into contact with the measuring object becomes small. Therefore, the film rubbing against the measuring object to tear can be restrained.

With the sixth aspect, since the end portion of the opening has a semi-elliptical or semicircular shape, stress concentration that occurs on the film during sweeping can be relaxed, restraining the film from tearing.

With the seventh aspect, since the end portion of the frame is inclined, a strong force is not easily applied to a part of the film even when the tactile sensor inclines forward during sweeping, restraining the film from tearing.

BRIEF DESCRIPTION OF DRAWINGS

FIG. 5 is an explanatory drawing of a tactile sensation measuring method when the sensor element is used alone.

DETAILED DESCRIPTION

Next, embodiments of the present invention will be described based on drawings.

First Embodiment (Sensor Element)

A tactile sensor according to the first embodiment of the present invention has a sensor element. While a configuration of the sensor element is not specifically limited, for example, the following configuration can be formed.

Figure 1:
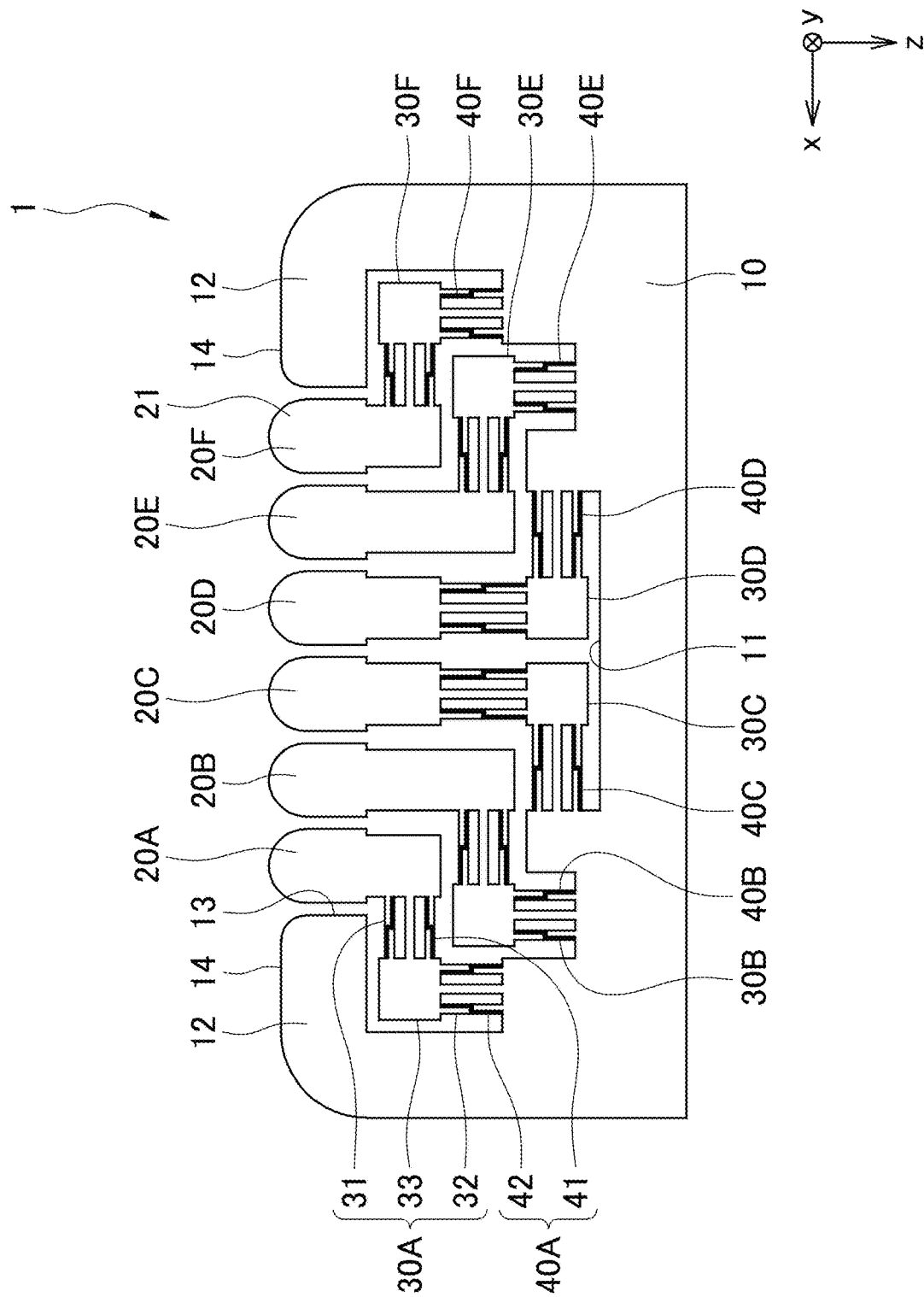
FIG. 1 is a plan view of a sensor element according to a first embodiment.

As illustrated in FIG. 1, a sensor element 1 is formed by processing a semiconductor substrate by semiconductor micromachining techniques. Mechanical structure of the sensor element 1 is formed by etching the semiconductor substrate in a predetermined pattern to remove an unnecessary part. Accordingly, the sensor element 1 is in a flat plate shape as a whole. The overall dimension of the sensor element 1 is not specifically limited, but it is, for example, 1 to 20 mm square.

The sensor element 1 has one side surface as a sensing surface that receives a force from a measuring object. In this embodiment, a side surface on the upper side in FIG. 1 among side surfaces of the sensor element 1 is the sensing surface.

The sensor element 1 has an approximately rectangular base portion 10. The base portion 10 has a space portion 11 formed at a central portion. On an edge portion 12 on the sensing surface side of the base portion 10, a gap 13 is formed at the center. The space portion 11 is communicated with an outside of the base portion 10 via the gap 13.

A side surface constituting a part of the sensing surface among side surfaces of the edge portion 12 is referred to as a reference surface 14. The reference surface 14 is divided into two by the gap 13. One reference surface 14 is arranged on a plane to which the other reference surface 14 is extended.

Hereinafter, an x-axis, a y-axis, and a z-axis are defined with reference to the reference surface 14. The x-axis and the y-axis are axes parallel to the reference surface 14. The y-axis is perpendicular to the x-axis. The x-axis is along a width direction of the sensor element 1, and the y-axis is along a thickness direction of the sensor element 1. The z-axis is an axis perpendicular to the reference surface 14. An x-z plane is parallel to front and back main surfaces that the flat plate-shaped sensor element 1 has. A direction along the x-axis is referred to as an x-axis direction. A direction along the y-axis referred to as a y-axis direction. A direction along the z-axis is referred to as a z-axis direction.

In the gap 13 of the base portion 10, a plurality of contacts 20A to 20F are arranged. While the number of the contacts 20A to 20F is not specifically limited, the sensor element 1 of this embodiment has six contacts 20A to 20F. The number of the contacts 20A to 20F may be one.

Each of the contacts 20A to 20F is a rod-shaped member, and its center axis is arranged along the z-axis. The plurality of contacts 20A to 20F are arranged side by side along the x-axis. The contacts 20A to 20F are arranged side by side between the two reference surfaces 14, 14 (edge portions 12, 12).

It is preferred that distal end portions of the contacts 20A to 20F project outward from the reference surface 14. The distal end portion of each of the contacts 20A to 20F is referred to as a contact end 21. The contact end 21 has a side surface constituting a part of the sensing surface. The shape of the contact end 21 is not specifically limited, and may be a semicircular shape or a fan shape.

All the contact ends 21 of the contacts 20A to 20F are usually designed to have an identical shape and an identical dimension. The contacts 20A to 20F are usually arranged at regular intervals along the x-axis. While the interval (center-to-center distance) of the adjacent contacts 20A and 20B is not specifically limited, it is preferably 300 to 700 μm, and, for example, 500 μm. This is nearly equal to the interval between ridgelines constituting human fingerprints. It is considered that this allows the sensor element 1 to perform detection close to a human tactile sensation.

From a perspective of realizing detection close to a human tactile sensation, the contact ends 21 preferably have a shape and a dimension similar to those of a cross-sectional surface of a ridge constituting fingerprints. Specifically, it is preferred that the contact ends 21 have a semicircular shape and its diameter is 100 to 500 μm.

Between the contacts 20A to 20F, gaps are provided. Accordingly, the width dimension of each of the contacts 20A to 20F is smaller than the interval of the adjacent contacts 20A and 20B. The width dimension of each of the contacts 20A to 20F is, for example, 200 to 600 μm. Providing the gaps between the contacts 20A to 20F allows the contacts 20A to 20F to be displaced independently.

In the space portion 11 of the base portion 10, a plurality of support bodies 30A to 30F are arranged. The support bodies 30A to 30F support the plurality of respective contacts 20A to 20F with respect to the base portion 10. The number of the support bodies 30A to 30F is equal to the number of the contacts 20A to 20F. The sensor element 1 of this embodiment has six support bodies 30A to 30F. The respective contacts 20A to 20F are supported by the support bodies 30A to 30F corresponding to the contacts 20A to 20F.

For example, the first contact 20A and the base portion 10 are coupled via the first support body 30A. The support body 30A is formed of one or a plurality of lateral beams 31 and one or a plurality of longitudinal beams 32, and a coupling portion 33. The lateral beams 31 are bridged between the contact 20A and the coupling portion 33. The longitudinal beams 32 are bridged between the coupling portion 33 and the base portion 10. The longitudinal beams 32 may be bridged between the contact 20A and the coupling portion 33, and the lateral beams 31 may be bridged between the coupling portion 33 and the base portion 10.

The lateral beams 31 have elasticity and have a similar property to that of a plate spring. The lateral beams 31 are arranged along the x-axis. Accordingly, the lateral beams 31 allow a displacement in the z-axis direction of the contact 20A. The longitudinal beams 32 have elasticity and have a similar property to that of a plate spring. The longitudinal beams 32 are arranged along the z-axis. Accordingly, the longitudinal beams 32 allow a displacement in the x-axis direction of the contact 20A. That is, the contact 20A is supported in a displaceable manner in the x-axis direction and the z-axis direction with respect to the reference surface 14.

The numbers and the dimensions (length, width) of the lateral beams 31 and the longitudinal beams 32 that constitute the support body 30A are not specifically limited. The numbers and the dimensions of the lateral beams 31 and the longitudinal beams 32 may be set such that the required elasticity is obtained as the support body 30A.

The other support bodies 30B to 30F have configurations similar to that of the first support body 30A. The other contacts 20B to 20F are also supported in a displaceable manner in the x-axis direction and the z-axis direction with respect to the reference surface 14. The support bodies 30A to 30F may be configured of a member other than the beam as long as desired elasticity can be obtained.

When a normal force (force in the z-axis direction) acts on the sensing surface of the sensor element 1, the contacts 20A to 20F are displaced in the z-axis direction. Additionally, when a tangential force (force in the x-axis direction) acts on the sensing surface of the sensor element 1, the contacts 20A to 20F are displaced in the x-axis direction. In order to detect such displacements of the contacts 20A to 20F, a plurality of displacement detectors 40A to 40F are disposed.

The number of the displacement detectors 40A to 40F is equal to the number of the contacts 20A to 20F. The sensor element 1 of this embodiment has six displacement detectors 40A to 40F. The displacement detectors 40A to 40F allow independently detecting the displacements of the respective contacts 20A to 20F with respect to the reference surface 14. The respective displacement detectors 40A to 40F are disposed in the support bodies 30A to 30F corresponding to the displacement detectors 40A to 40F.

For example, the first displacement detector 40A is disposed in the first support body 30A. The first displacement detector 40A allows detecting a displacement of the first contact 20A with respect to the reference surface 14. The displacement detector 40A is formed of a longitudinal displacement detector 41 that detects a displacement in the z-axis direction of the contact 20A and a lateral displacement detector 42 that detects a displacement in the x-axis direction of the contact 20A.

Figure 2A:
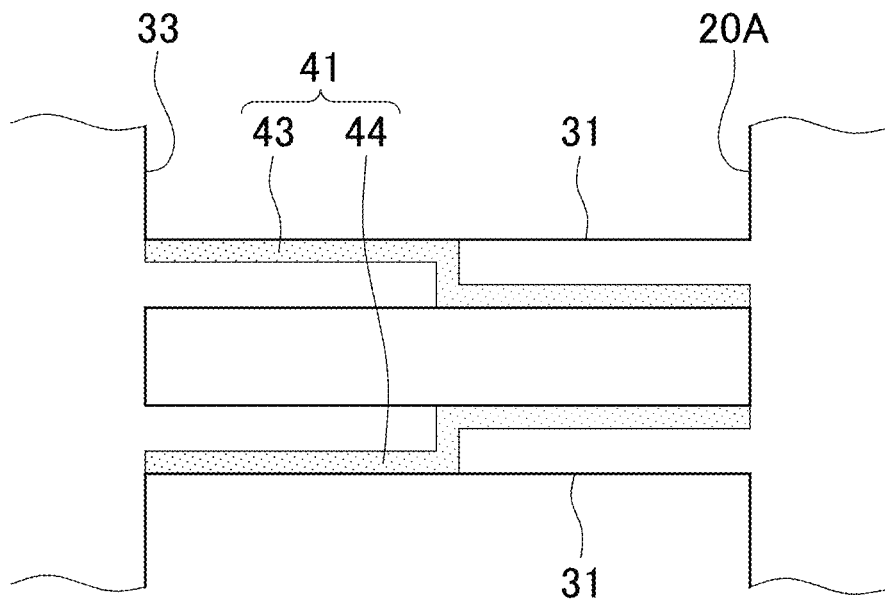
FIG. 2A is an explanatory drawing of first and second strain detection elements when there is no strain in lateral beams of a support body.

As illustrated in FIG. 2A, the longitudinal displacement detector 41 is formed of first and second strain detection elements 43 and 44 that detect a strain of the lateral beam 31. A piezoresistive element can be used as the first and second strain detection elements 43 and 44. The piezoresistive element can be formed on a surface of a semiconductor substrate by an integrated circuit manufacturing process, such as an impurity diffusion and an ion implantation, a metal wiring forming technique, and the like.

The first strain detection element 43 is formed on a surface of one lateral beam 31 among the plurality of lateral beams 31 constituting the support body 30A. The second strain detection element 44 is formed on a surface of another one lateral beam 31. The first and second strain detection elements 43 and 44 are each formed in a staircase pattern and have a shape that is along one side portion from one end to the center of the lateral beam 31 and along the other side portion from the center to the other end. In addition, the first strain detection element 43 formed on the one lateral beam 31 and the second strain detection element 44 formed on the other lateral beam 31 each have a shape that is linearly symmetrical.

Figure 2B:
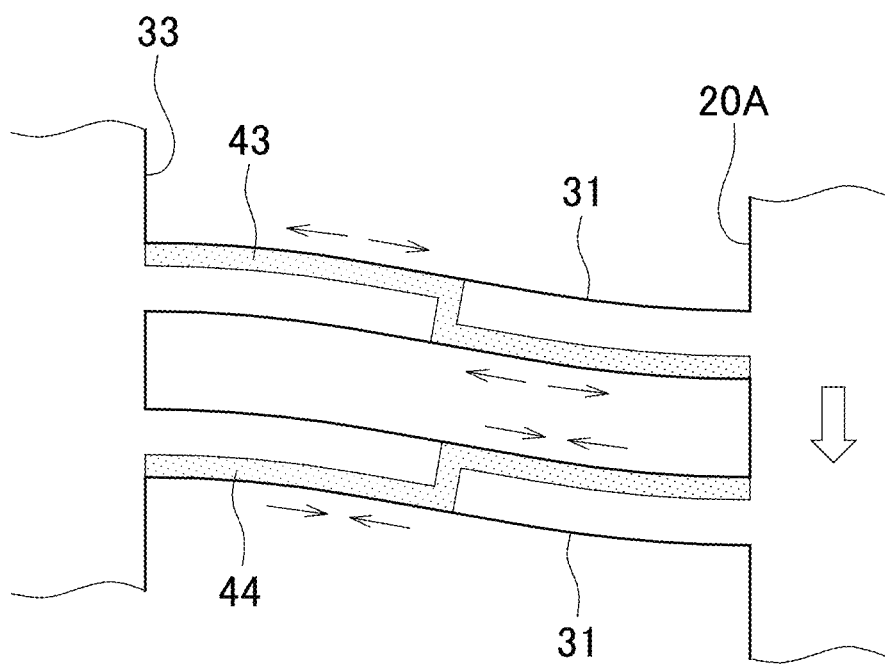
FIG. 2B is an explanatory drawing of the first and second strain detection elements when there is a strain in the lateral beams of the support body.

As illustrated in FIG. 2B, when the contact 20A is displaced in the z-axis direction, a strain is generated in the lateral beams 31. In this respect, when the first and second strain detection elements 43 and 44 are materials that exhibit a positive piezoresistance coefficient, the first strain detection element 43 has an increased resistance due to a tensile stress and the second strain detection element 44 has a decreased resistance due to a compressive stress. When the displacement direction of the contact 20A is inverted, the first strain detection element 43 has a decreased resistance due to the compressive stress and the second strain detection element 44 has an increased resistance due to the tensile stress.

Figure 3:
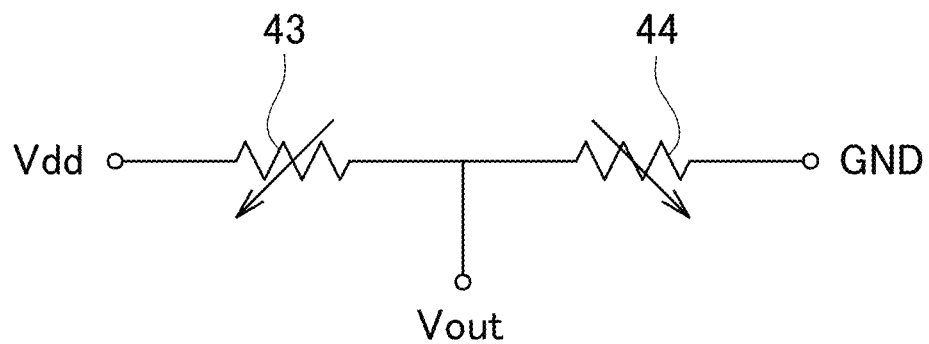
FIG. 3 is a circuit diagram of a strain detection circuit.

As illustrated in FIG. 3, a strain detection circuit (not illustrated in FIG. 1 or FIG. 2) that detects a strain of the lateral beam 31 is formed on a surface of the sensor element 1. The strain detection circuit is a circuit that couples the first strain detection element 43 with the second strain detection element 44 in series and applies a voltage Vdd on both ends, and reads a voltage Vout between the first strain detection element 43 and the second strain detection element 44. The voltage Vout changes by the difference between the first and second strain detection elements 43 and 44. Reading the voltage Vout can detect a strain amount of the lateral beam 31. This allows the longitudinal displacement detector 41 to detect the displacement in the z-axis direction of the contact 20A with respect to the reference surface 14.

Figure 4A:
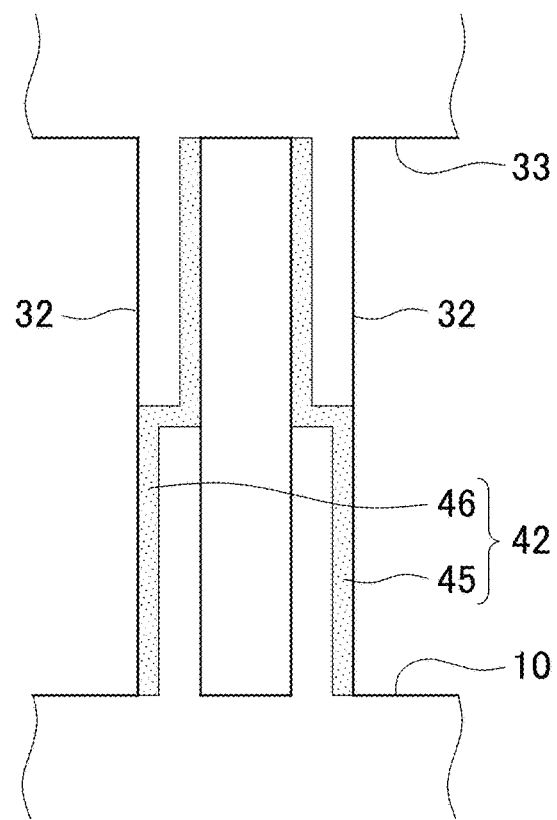
FIG. 4A is an explanatory drawing of third and fourth strain detection elements when there is no strain in longitudinal beams of the support body.

As illustrated in FIG. 4A, the lateral displacement detector 42 is formed of third and fourth strain detection elements 45 and 46 that detect a strain of the longitudinal beam 32. The piezoresistive element can be used as the third and fourth strain detection elements 45 and 46.

The third strain detection element 45 is formed on a surface of one longitudinal beam 32 among the plurality of longitudinal beams 32 constituting the support body 30A. The fourth strain detection element 46 is formed on a surface of another one longitudinal beam 32. The third and fourth strain detection elements 45 and 46 are formed in a symmetrical staircase pattern.

Figure 4B:
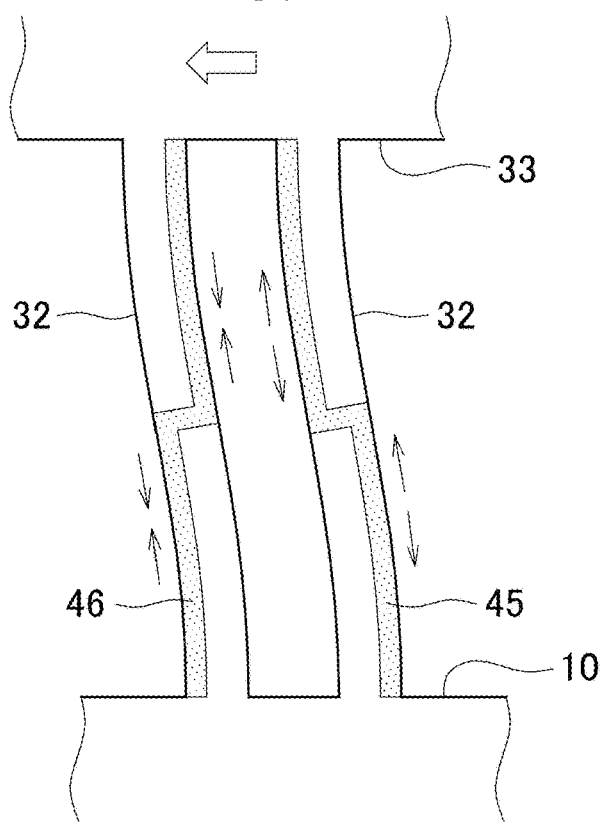
FIG. 4B is an explanatory drawing of the third and fourth strain detection elements when there is a strain in the longitudinal beams of the support body.

As illustrated in FIG. 4B, when the contact 20A is displaced in the x-axis direction, a strain is generated in the longitudinal beams 32. In this respect, when the third and fourth strain detection elements 45 and 46 are materials that exhibit a positive piezoresistance coefficient, the third strain detection element 45 has an increased resistance due to the tensile stress and the fourth strain detection element 46 has a decreased resistance due to the compressive stress. When the displacement direction of the contact 20A is inverted, the third strain detection element 45 has a decreased resistance due to the compressive stress and the fourth strain detection element 46 has an increased resistance due to the tensile stress.

A strain detection circuit (not illustrated in FIG. 1 or FIG. 4) that detects a strain of the longitudinal beam 32 is formed on a surface of the sensor element 1. The circuit is a circuit in which the first strain detection element 43 is replaced with the third strain detection element 45 and the second strain detection element 44 is replaced with the fourth strain detection element 46 in the circuit illustrated in FIG. 3. The strain detection circuit detects a strain of the longitudinal beam 32. This allows the lateral displacement detector 42 to detect a displacement in the x-axis direction of the contact 20A with respect to the reference surface 14.

The other displacement detectors 40B to 40F have configurations similar to that of the first displacement detector 40A. The first to fourth strain detection elements 43 to 46 are not limited to the piezoresistive element. For example, the displacement detectors 40A to 40F may be configured to detect an electrostatic capacity between the contacts 20A to 20F and the base portion 10 by using that the distance between the contacts 20A to 20F and the base portion 10 changes by the displacements of the contacts 20A to 20F.

The sensor element 1 can be manufactured by, for example, processing a SOI substrate in the following procedure. Here, the SOI substrate has a three-layer structure of a supporting substrate (silicon), an oxide film layer (silicon dioxide), and an active layer (silicon) and its thickness is, for example, 300 μm.

First, the substrate is cleaned and an oxidation treatment is performed on the substrate to form a surface oxide film. Next, the surface oxide film is processed to form a diffusion layer pattern that becomes the circuit portion, and phosphorus diffusion is performed. Next, a piezoresistive element is formed by an ion implantation of phosphorus and a thermal annealing process. Next, a chrome thin film is sputtered on a back surface of the substrate, and the chrome thin film is processed into a pattern to release a movable structure portion (the contacts 20A to 20F and the support bodies 30A to 30F). Next, the surface oxide film is removed and etched by ICP-RIE to form the movable structure portion. After filling a resist near the formed movable structure portion for protection, the back surface is etched by ICP-RIE. Finally, an intermediate oxide film and the resist are removed to release the movable structure portion.

The method for manufacturing the sensor element 1 is not limited to the semiconductor micromachining techniques. For example, a whole or a part of the sensor element 1 may be formed by modeling techniques by a three-dimensional printer.

Next, a tactile sensation measuring method when the sensor element 1 is used alone will be described.

When a measurement is performed using the sensor element 1, the sensing surface of the sensor element 1 is swept while it is pressed against a measuring object. Then, the contacts 20A to 20F are displaced in the x-axis direction and the z-axis direction. Based on the displacements, a surface shape and a friction force of the measuring object can be measured. The following describes its principle.

FIG. 5 illustrates the movement of a single contact 20. When the sensing surface of the sensor element 1 is pressed against a measuring object O, the reference surface 14 is arranged on a plane that connects peaks of ruggedness on a surface of the measuring object O. Then, the contact 20 is pushed in by a reactive force of a pressing force of the sensor element 1 to be displaced in the z-axis direction.

The sensing surface of the sensor element 1 is swept along the surface of the measuring object O while it is pressed against the measuring object O. The sweep is performed in the x-axis direction. Accordingly, the x-axis direction is also referred to as a sweep direction. When the sensor element 1 is swept, the contact 20 is displaced in the z-axis direction along the ruggedness on the surface of the measuring object O. Further, the contact 20 is displaced in the x-axis direction by a friction force acting between the contact end 21 and the measuring object O.

Figure 6:
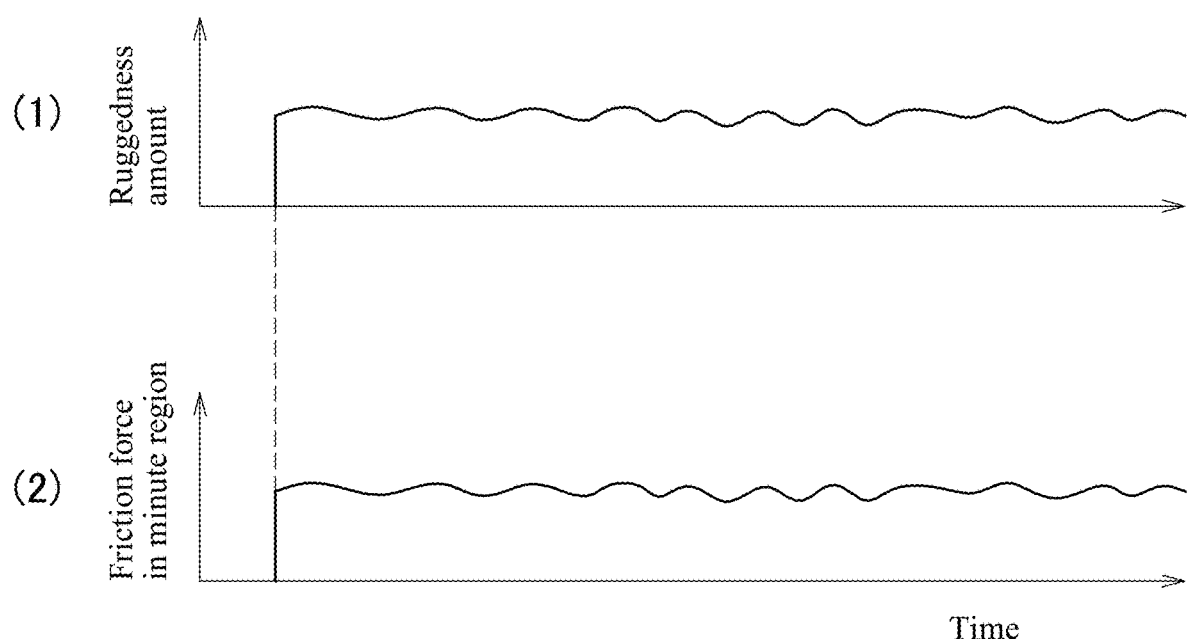
FIG. 6 illustrates graphs exemplifying various signals obtained from the sensor element.

FIG. 6 illustrates an example of various signals obtained from the sensor element 1 by the above-described operation.

In a graph (1), the horizontal axis indicates a time period, and the vertical axis indicates a displacement in the z-axis direction of the contact 20 detected by the longitudinal displacement detector 41. When the sensor element 1 is swept at a constant speed along the surface of the measuring object O, the horizontal axis is synonymous with a positional coordinate of the surface of the measuring object O. The displacement in the z-axis direction of the contact 20 means a ruggedness amount on the surface of the measuring object O. Accordingly, the graph (1) is a reproduction of the surface shape (spatial waveform) of the surface of the measuring object O.

In a graph (2), the horizontal axis indicates a time period, and the vertical axis indicates a displacement in the x-axis direction of the contact 20 detected by the lateral displacement detector 42. The displacement in the x-axis direction of the contact 20 means the friction force acting between the contact end 21 and the measuring object O. Here, since a contacted area of the contact end 21 with the measuring object O is small, the displacement in the x-axis direction of the contact 20 means a friction force in a minute region.

From the displacements in the x-axis direction and the z-axis direction of the contact 20, a dynamic friction coefficient μ in a minute region on the surface of the measuring object O can be obtained. Since the elastic modulus of the lateral beam 31 is already-known, a perpendicular load $f_z$ applied on the contact 20 can be calculated from the displacement in the z-axis direction of the contact 20. Since the elastic modulus of the longitudinal beam 32 is already-known, a friction force $f_x$ applied on the contact 20 can be calculated from the displacement in the x-axis direction of the contact 20. According to the following formula (1), the dynamic friction coefficient μ in a minute region on the surface of the measuring object O can be calculated from the perpendicular load $f_z$ and the friction force $f_x$.

$$\mu = f_x / f_y \quad (1)$$

As described above, by detecting the displacements in the x-axis direction and the z-axis direction of the contact 20, fine properties, that is, the fine ruggedness and the friction force in a minute region, of the surface of the measuring object O can be detected.

The sensor element 1 of this embodiment has the plurality of contacts 20A to 20F and can detect the displacements of the respective contacts 20A to 20F. Therefore, when the above-described operation is performed using the sensor element 1, measurements at a plurality of points can be simultaneously performed. This allows multipoint detection of the properties of the surface of the measuring object O with high spatial resolution.

(Casing)

As illustrated in FIG. 1, in the sensor element 1, the fine mechanical structure is exposed. Therefore, as illustrated in FIG. 5, when the sensing surface is directly brought into contact with the measuring object O to sweep the sensor element 1, liquids and dust accumulating on the surface of the measuring object O gets into gaps in the mechanical structure. This inhibits the movement of the mechanical structure, lowering measurement accuracy.

Figure 7:
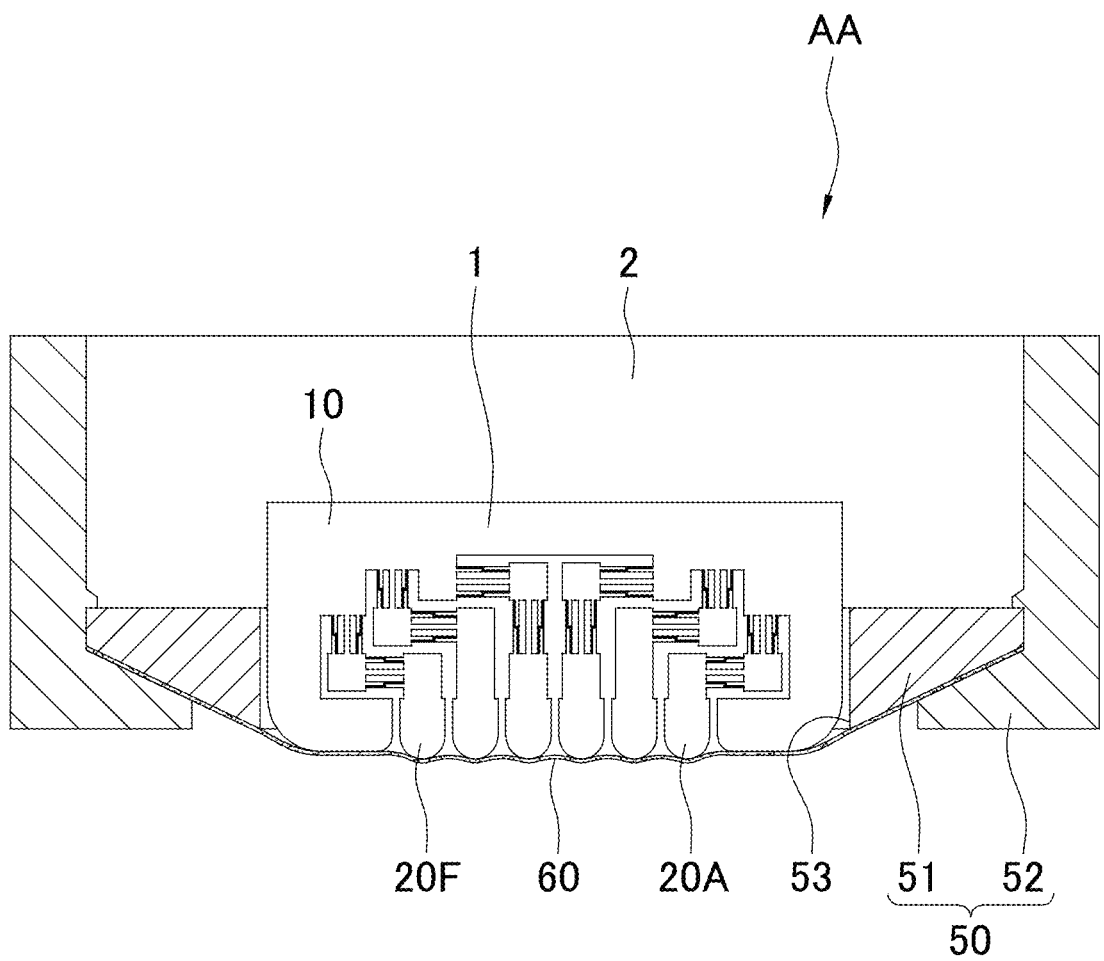
FIG. 7 is a vertical cross sectional view of a tactile sensor according to the first embodiment.

Therefore, as illustrated in FIG. 7, a tactile sensor AA of this embodiment has a casing 2 that houses the sensor element 1. Since the sensor element 1 is housed in the casing 2, liquids and dust do not intrude into the sensor element 1. That is, the tactile sensor AA has waterproof and dust-proof properties.

The casing 2 has a casing main body 50 formed of a frame 51 and an exterior body 52. In the casing main body 50, an opening 53 is formed. The opening 53 is closed by a film 60. The sensor element 1 has the sensing surface arranged in the opening 53 and is in close contact with the film 60. When a tactile sensation is measured by the tactile sensor AA, the film 60 directly comes into contact with the measuring object O, and the sensing surface of the sensor element 1 indirectly comes into contact with the measuring object O via the film 60 (see FIG. 14). Accordingly, the sensor element 1 is protected from liquids and dust by the film 60.

Figure 8:
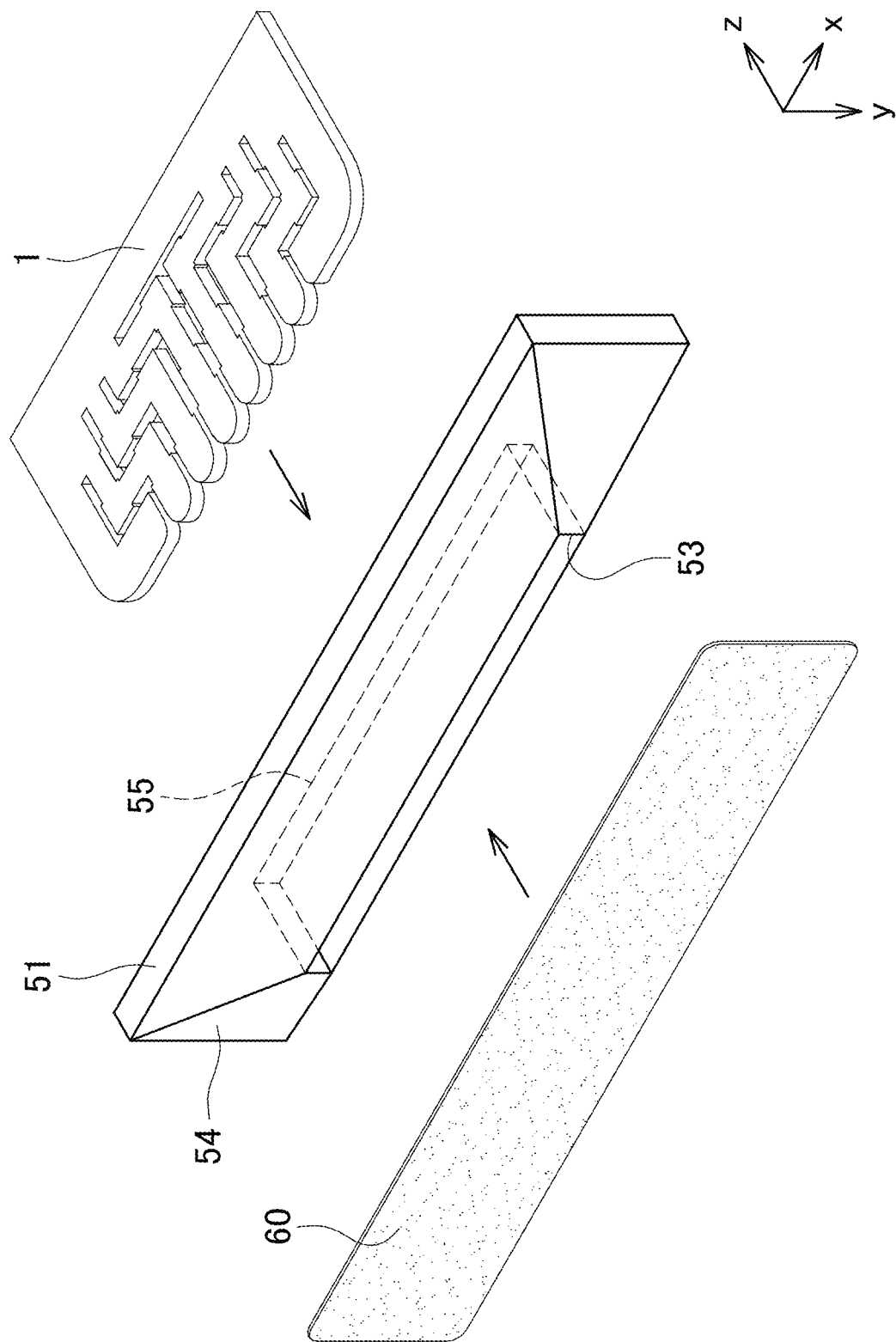
FIG. 8 is an exploded view of the sensor element, a frame, and a film.

As illustrated in FIG. 8, the frame 51 is an approximately plate-shaped member. The frame 51 has a front surface (one main surface) having a truncated square pyramid shape with the central portion projecting outward. The surface having a truncated square pyramid shape is referred to as an attaching surface 54. Inside the frame 51, a slit 55 communicated from the attaching surface 54 (front surface) to the back surface is formed. The slit 55 opens at the center, that is, the most projecting portion, of the attaching surface 54. This opening positioned in the attaching surface 54 is the opening 53. The slit 55 and the opening 53 are horizontally long, and the dimensions in the x-axis direction are slightly longer than the width dimension of the sensor element 1. The dimensions in the y-axis direction of the slit 55 and the opening 53 are slightly longer than the thickness of the sensor element 1.

The film 60 is attached to the attaching surface 54 of the frame 51. Therefore, the opening 53 is closed by the film 60. The film 60 may close the opening 53 and need not be attached to the whole attaching surface 54.

The sensor element 1 is inserted into the slit 55 from the back surface of the frame 51. Inserted into the slit 55, the sensing surface of the sensor element 1 reaches the film 60.

Figure 9:
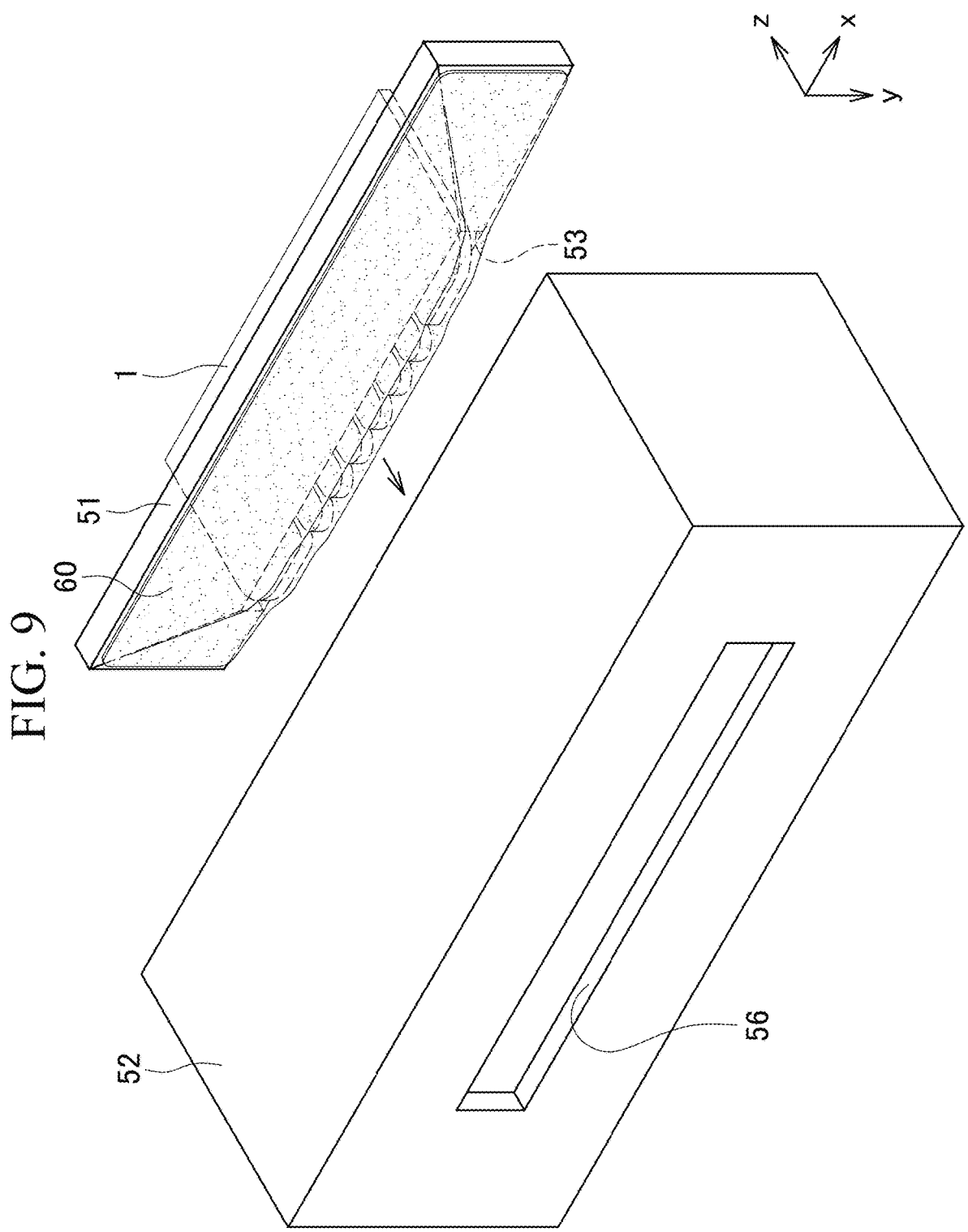
FIG. 9 is an exploded view of the sensor element, the frame, and an exterior body.

As illustrated in FIG. 9, the frame 51 and the sensor element 1 are inserted inside the exterior body 52. The exterior body 52 is an approximately rectangular parallelepiped member having an internal space. The exterior body 52 has one surface in which a window 56 communicating an inside with an outside. The window 56 is an opening slightly larger than the opening 53.

Figure 10:
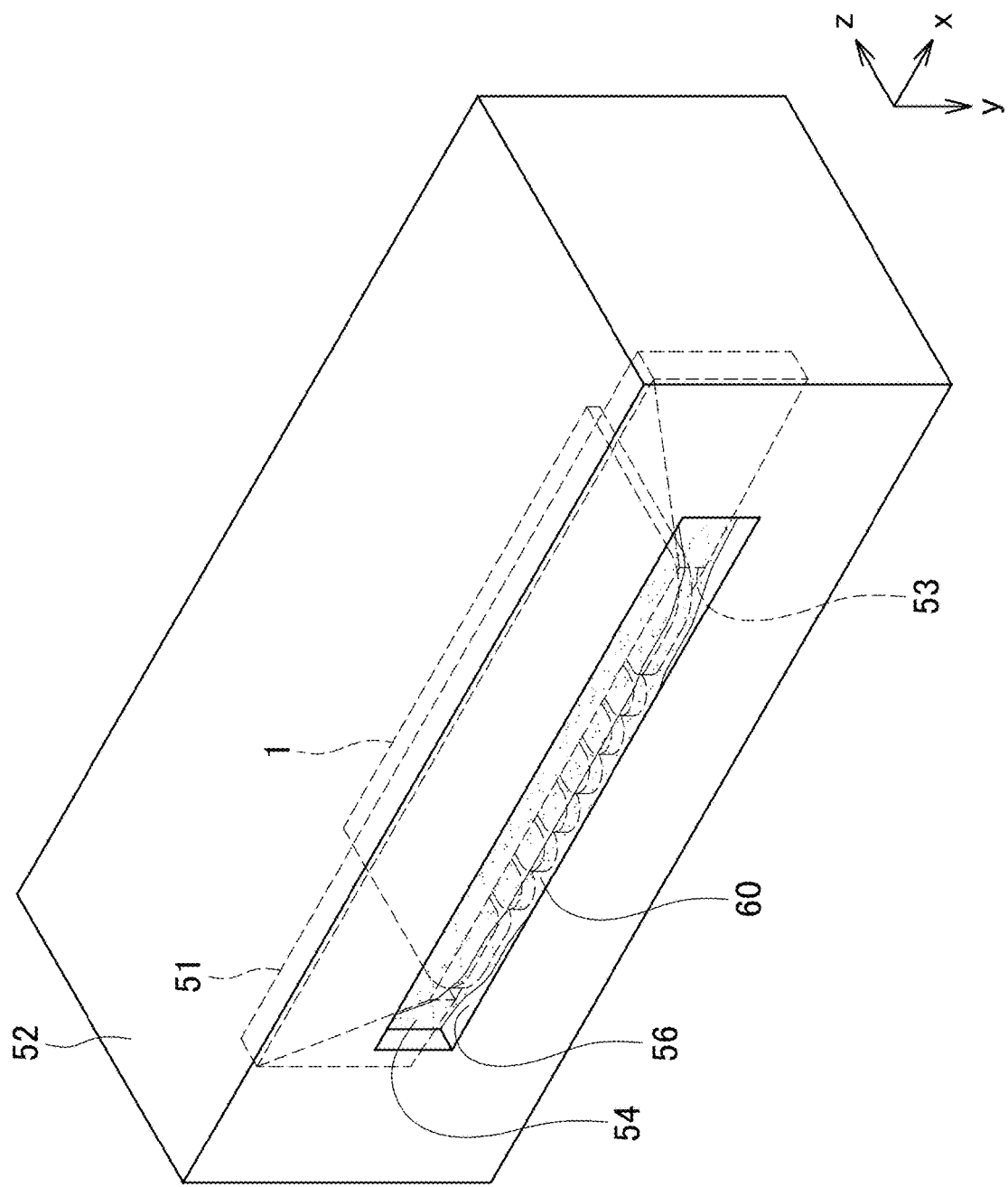
FIG. 10 is a perspective view of the tactile sensor.

As illustrated in FIG. 10, when the frame 51 and the exterior body 52 are combined, the center of the attaching surface 54 projecting outward is arranged in the window 56. That is, the whole opening 53 is arranged in the window 56. Further, a portion of the film 60 corresponding to the opening 53 and its peripheral area is exposed from the window 56, and a portion other than the portion is covered with the exterior body 52.

As illustrated in FIG. 7, the frame 51 is secured with respect to the exterior body 52. While the method for securing the frame 51 and the exterior body 52 is not specifically limited, the frame 51 may be locked on a protrusion disposed in the exterior body 52 or may be fastened with fasteners, such as bolts and nuts.

The base portion 10 of the sensor element 1 is secured with respect to the casing main body 50. The base portion 10 may be secured so as not to move with respect to the casing main body 50. The base portion 10 may be directly secured to the casing main body 50 or may be indirectly secured via another member. The securing method is not specifically limited. The movable structure portion (the contacts 20A to 20F and the support bodies 30A to 30F) of the sensor element 1 can be moved with respect to the casing main body 50.

Figure 11:
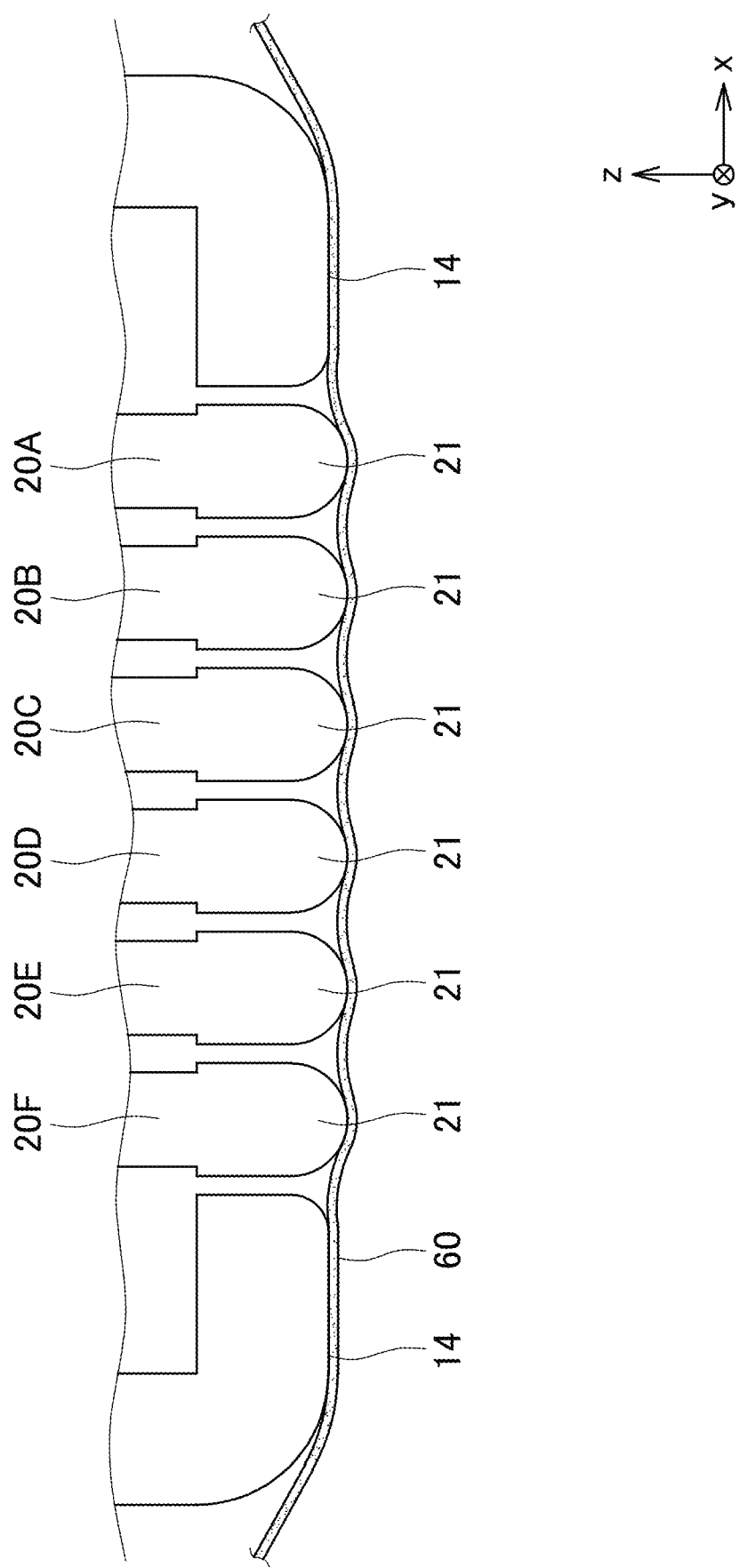
FIG. 11 is an enlarged view of a distal end portion of a contact.

While the contact ends 21 of the contacts 20A to 20F of the sensor element 1 may be arranged on the same plane as the opening 53, it is preferred that the contact ends 21 project outward from the opening 53. By doing this way, as illustrated in FIG. 11, the film 60 is pressed by the distal end portions of the contacts 20A to 20F and partially extends along the shapes of the contact ends 21. This causes the shapes of the contact ends 21 to appear on an outer surface of the film 60. It is preferred that the film 60 also comes in close contact with the reference surface 14.

The film 60 may be a film having flexibility. As the film 60, a resin film, such as polyurethane and latex, can be used. From a perspective of quality stability and durability, a medical film used as a material for adhesive plasters, medical gloves, and the like is preferably used as the film 60.

Figure 14:
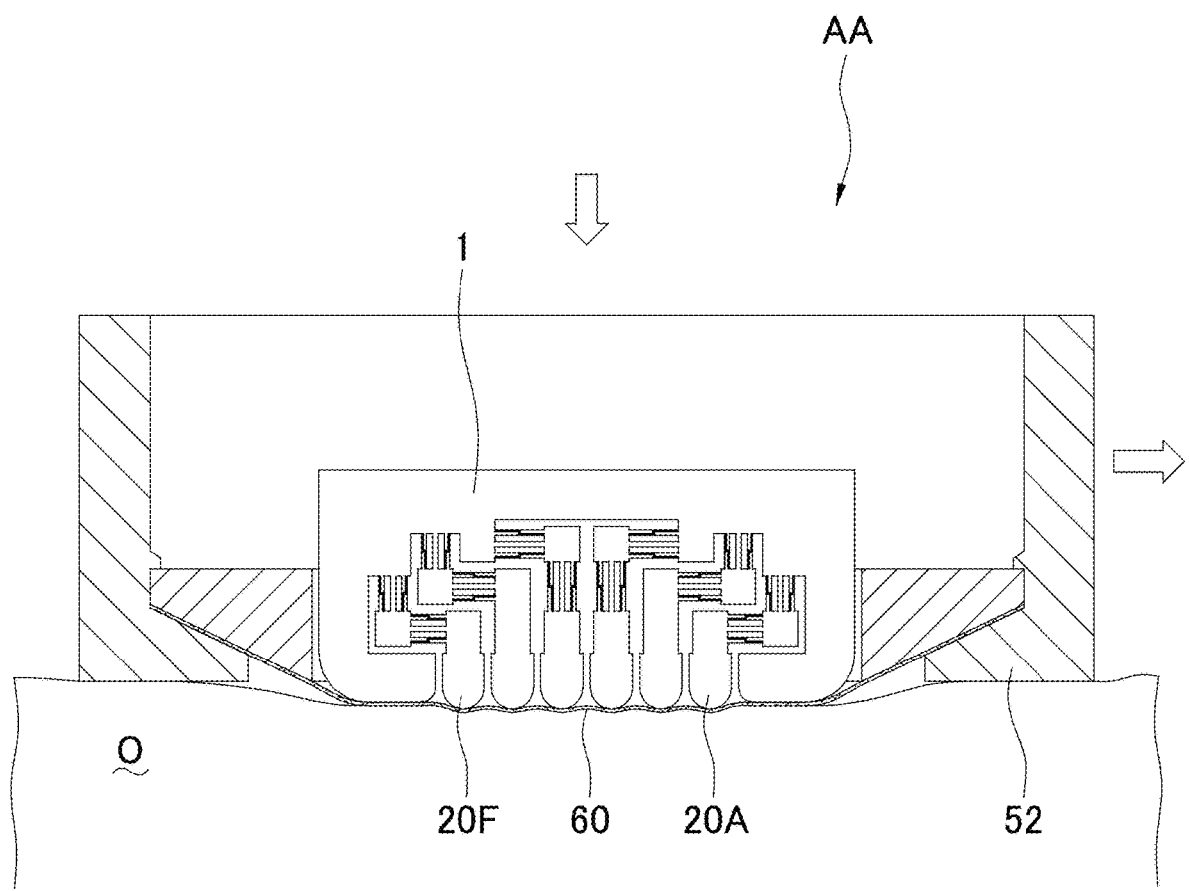
FIG. 14 is an explanatory drawing of a tactile sensation measuring method with the tactile sensor.

When a tactile sensation is measured, the film 60 is interposed between the contacts 20A to 20F and the measuring object O (see FIG. 14). In order to transmit a force received from a measuring object to the contact 20A to 20F without being dispersed or decayed, the film 60 is preferably thin. On the other hand, the film 60 requires durability to a degree of not tearing even when it rubs against the measuring object. That is, as long as the film 60 has a certain degree of durability, it is preferably thin. For example, a medical film (polyurethane film) having a thickness of 8 μm is sufficiently thin and has sufficient durability.

The film 60 preferably has a thickness sufficiently thinner than the diameter of the contact end 21. Specifically, the thickness of the film 60 is preferably equal to or less than the diameter of the contact end 21, more preferably ½ or less of the diameter, and even more preferably ⅓ or less of the diameter. For example, when the diameter of the contact ends 21 is 500 μm, the thickness of the film 60 is preferably equal to or less than 500 μm, more preferably 250 μm or less, and even more preferably 170 μm or less. In that case, the force received from the measuring object is not dispersed or decayed very much, and performance (spatial resolution and sensitivity) of the sensor element 1 can be maintained.

The contact ends 21 of the respective contacts 20A to 20F are secured to an inner surface of the film 60. A friction force acts between the outer surface of the film 60 and the measuring object. Against this friction force, the contact ends 21 are secured so as not to shift with respect to the film 60. While the method for securing the contact ends 21 and the film 60 is not specifically limited, for example, the following method can be employed.

Figure 12A:
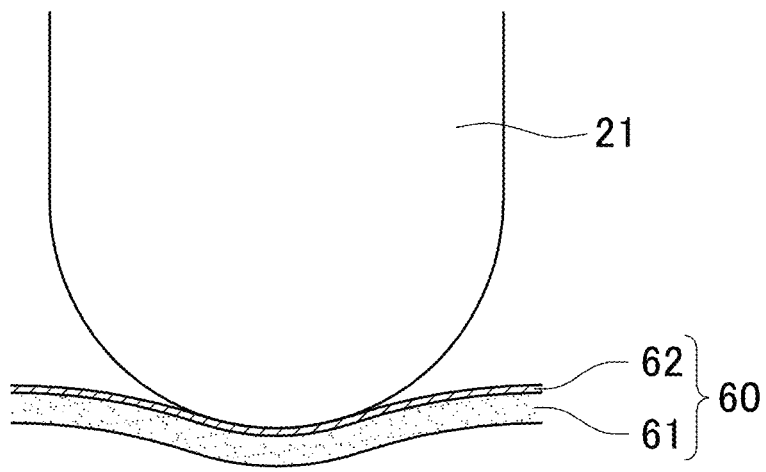
FIG. 12A is an enlarged view when an adhesive film is bonded to the contact.

As illustrated in FIG. 12A, a film with layer structure having a base layer 61 and an adhesive layer 62, that is, an adhesive film, as the film 60 may be used. The film 60 is disposed with the adhesive layer 62 as the inner surface. The contact ends 21 are bonded to the film 60 by the adhesive layer 62. Using an adhesive film as the film 60 also facilitates attachment to the frame 51.

Figure 12B:
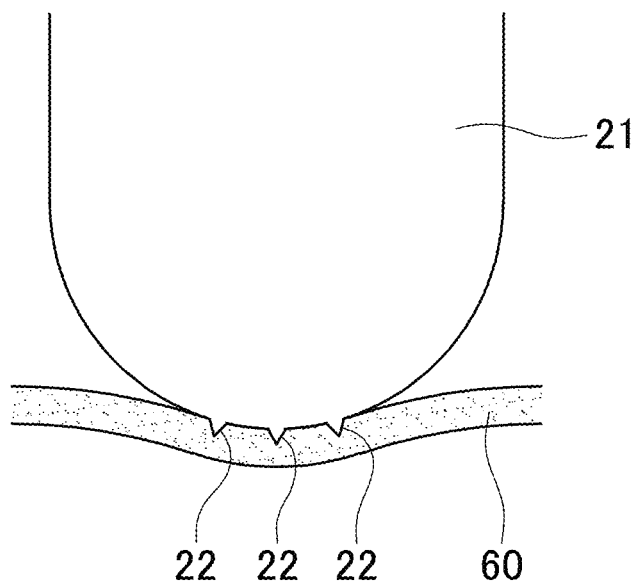
FIG. 12B is an enlarged view when spikes of a contact end are bitten into the film.

As illustrated in FIG. 12B, spikes 22 may be disposed on the contact end 21 to cause the spikes 22 to bite into the film 60. The number of the spikes 22 is not specifically limited, and may be one or plural. In order to restrain the film 60 from tearing by the spikes 22, the length of the spikes 22 is preferably equal to or less than half the thickness of the film 60. In addition, the spikes 22 may be disposed on the contact ends 21, and at the same time, an adhesive film may be used as the film 60.

Thus, by bonding the contact ends 21 to the film 60, or by securing the contact ends 21 to the film 60 by the spikes 22, the contact ends 21 do not shift with respect to the film 60. Therefore, the force that the film 60 receives from the measuring object is easily transmitted to the contacts 20A to 20F.

Figure 13A:
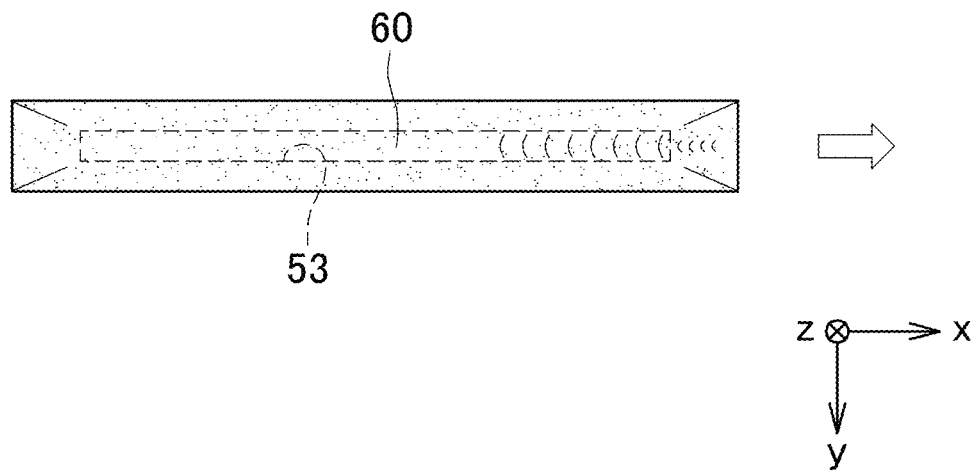
FIG. 13A is an enlarged view of an opening according to one embodiment.

The sensor element 1 of this embodiment has the horizontally long sensing surface. Therefore, as illustrated in FIG. 13A, the opening 53 may have a rectangular shape that is long in the width direction (x-axis direction) of the sensor element 1. When a tactile sensation is measured, the film 60 rubs against a measuring object in the sweep direction (x-axis direction). Therefore, at an end portion in the sweep direction of the opening 53, wrinkles are easily generated on the film 60. The wrinkles cause a possibility that the film 60 tears.

Figure 13B:
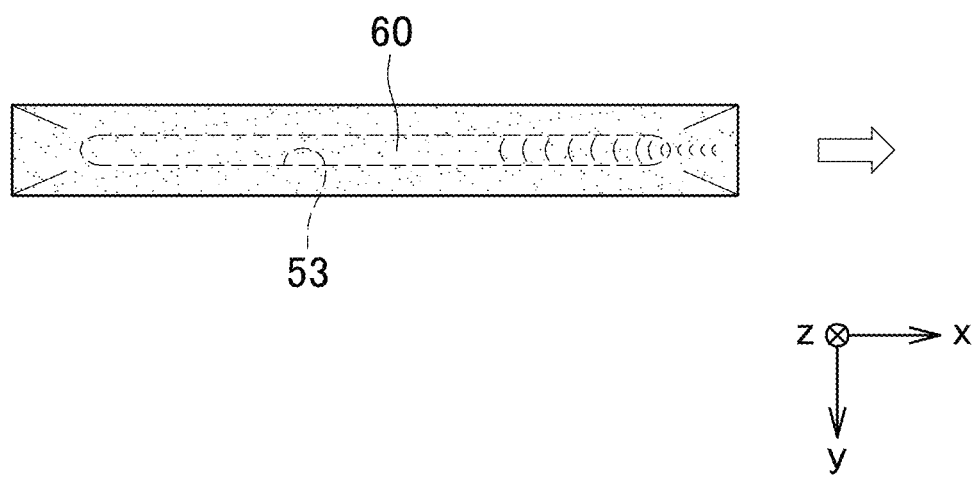
FIG. 13B is an enlarged view of the opening according to another embodiment.

Therefore, as illustrated in FIG. 13B, in the opening 53, the end portion in the sweep direction is preferably formed to have a semi-elliptical or semicircular shape. By doing so, stress concentration that occurs on the film 60 during sweeping can be relaxed, restraining the film 60 from tearing.

The casing 2 is not limited to the above-described configuration. The casing main body 50 need not have the configuration formed of two members of the frame 51 and the exterior body 52. The casing main body 50 may be formed of one member or may have a configuration formed of three or more members. Basically, the film 60 may be disposed on the casing main body 50 that has the opening 53 and the opening 53 may be closed by the film 60. By doing so, it is easy to secure the film 60.

The sensor element 1 may be incorporated in a device, such as an endoscope or a robot arm. In this case, a casing of the device in which the sensor element 1 is incorporated may be used as the casing main body 50 or the exterior body 52. That is, the opening 53 may be formed in the casing of the device and may be closed the opening 53 by the film 60.

Furthermore, the casing 2 need not have the casing main body 50. In an aspect in which intrusion of liquids and dust into the gaps in the mechanical structure of the sensor element 1 can be avoided, the film 60 may be provided so as to cover at least the sensing surface or the contact ends 21. For example, the configuration may be such that the whole sensor element 1 is wrapped by the film 60.

(Tactile Sensation Measuring Method)

Next, a tactile sensation measuring method using the tactile sensor AA will be described.

The operation of the tactile sensor AA in a tactile sensation measurement is basically the same as that in the case where the sensor element 1 is used alone. That is, as illustrated in FIG. 14, the tactile sensor AA is swept while it is pressed against the measuring object O. Here, the sensing surface of the sensor element 1 is brought into contact with the measuring object O via the film 60.

Since a part of the film 60 is covered with the exterior body 52, an area where the film 60 comes into contact with the measuring object O becomes small only by that amount. That is, only a portion of the film 60 corresponding to the opening 53 and its peripheral area come into contact with the measuring object O. Since the measuring object O also comes into contact with the exterior body 52, a pressing force of the tactile sensor AA does not act only on the film 60 but is also dispersed to the exterior body 52. Therefore, the film 60 rubbing against the measuring object O to tear can be restrained.

When the tactile sensor AA is swept while it is pressed against the measuring object O, the contacts 20A to 20F are displaced in the x-axis direction and the z-axis direction. Based on the displacements, the surface shape and the friction force of the measuring object O can be measured. Its principle is the same as that in the case where the sensor element 1 is used alone.

Compared with the case where the sensor element 1 is used alone, the tactile sensor AA is different in that the contacts 20A to 20F indirectly come into contact with the measuring object O via the film 60. Here, if the contacts 20A to 20F were not secured to the film 60, especially in a case where the tangential force is received, the film 60 would only shift laterally, and the contacts 20A to 20F would not be displaced. However, in this embodiment, since the contact ends 21 are secured to the inner surface of the film 60, the contacts 20A to 20F move following the movement of the film 60 that directly comes into contact with the measuring object O. Therefore, a decrease in spatial resolution and sensitivity of the sensor element 1 can be restrained.

Figure 15:
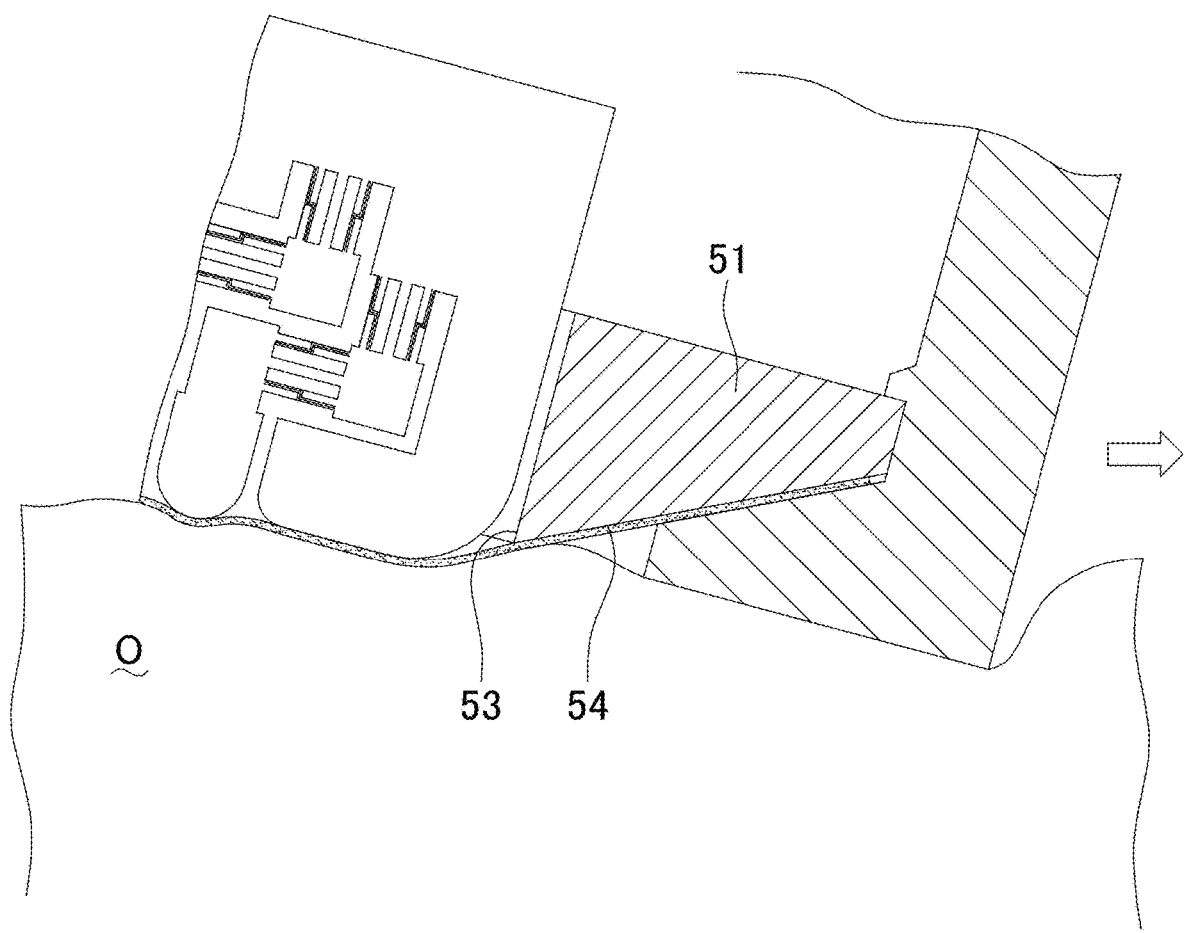
FIG. 15 is an explanatory drawing when the tactile sensor inclines forward.

When the tactile sensor AA is swept while it is pressed against the measuring object O, the tactile sensor AA inclines forward in the sweep direction in some cases as illustrated in FIG. 15. In this case, if the attaching surface 54 of the frame 51 were a plane flush with the opening 53, an end portion in the sweep direction of the frame 51 would bite into the measuring object O. Then, a portion of the film 60 corresponding to the end portion in the sweep direction of the frame 51 may rub strongly to tear.

In this respect, in the frame 51 of this embodiment, the attaching surface 54 has a truncated square pyramid shape. That is, the end portion in the sweep direction of the frame 51 is an inclined surface. This inclined surface has an inclination that separates from the measuring object O as it separates from the opening 53 in the sweep direction. Therefore, even when the tactile sensor AA inclines forward during sweeping, a strong force is not easily applied to a part of the film 60, restraining the film 60 from tearing.

As described above, the tactile sensor AA can achieve both the high spatial resolution and sensitivity that the sensor element 1 has and waterproof and dust-proof properties. Therefore, a tactile sensation can be measured even in an environment where sweat, blood, or the like may accumulate, such as in the fields of medicine, nursing care, and beauty and health. In addition, a tactile sensation can be measured even in the industrial field where dust, droplets, or the like may accumulate.

Second Embodiment

Figure 16:
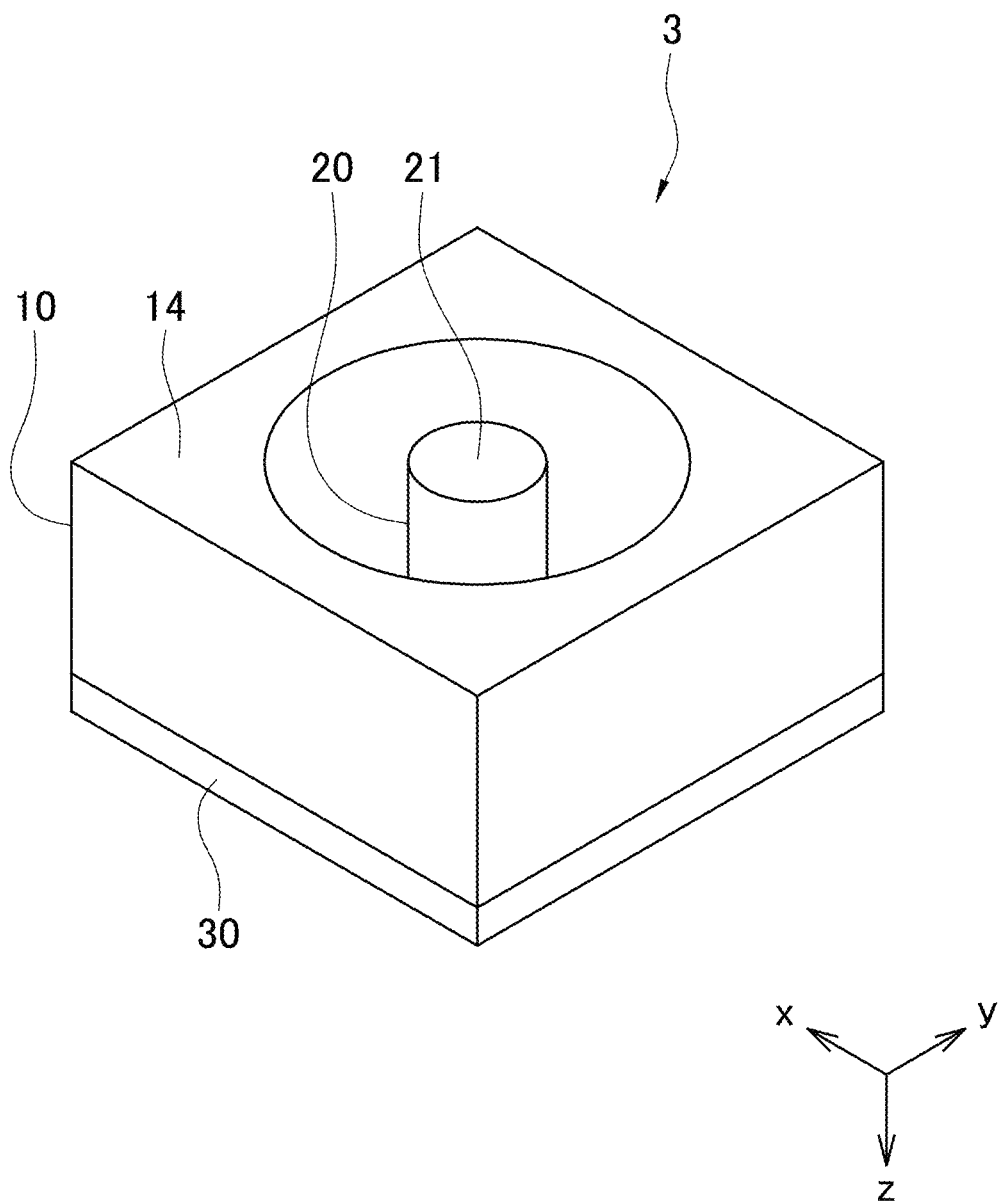
FIG. 16 is a perspective view of a sensor element according to a second embodiment.

The configuration of a sensor element is not limited to that of the above-described embodiment. For example, a sensor element 3 having a configuration illustrated in FIG. 16 may be used.

The sensor element 3 mainly has the base portion 10, the contact 20, and a diaphragm 30. The base portion 10 has a column-shaped space portion. The space portion has a lower side opening closed by the diaphragm 30. The contact 20 having a column shape is disposed upright at the center of the diaphragm 30. That is, in the center of the column-shaped space portion that the base portion 10 has, the contact 20 is disposed. The diaphragm 30 is a support body that supports the contact 20 with respect to the base portion 10.

The sensor element 3 has an upper surface as a sensing surface that receives a force from a measuring object. Accordingly, the upper surface of the base portion 10 is the reference surface 14, and the upper surface of the contact 20 is the contact end 21.

Between the base portion 10 and the contact 20, a gap in which the contact 20 can swing is provided. When the contact 20 inclines in the x-axis direction and the y-axis direction or is displaced in the z-axis direction by an external force, the diaphragm 30 gets distorted. In order to detect such deformation of the diaphragm 30, a displacement detector is formed in the diaphragm 30.

Figure 17:
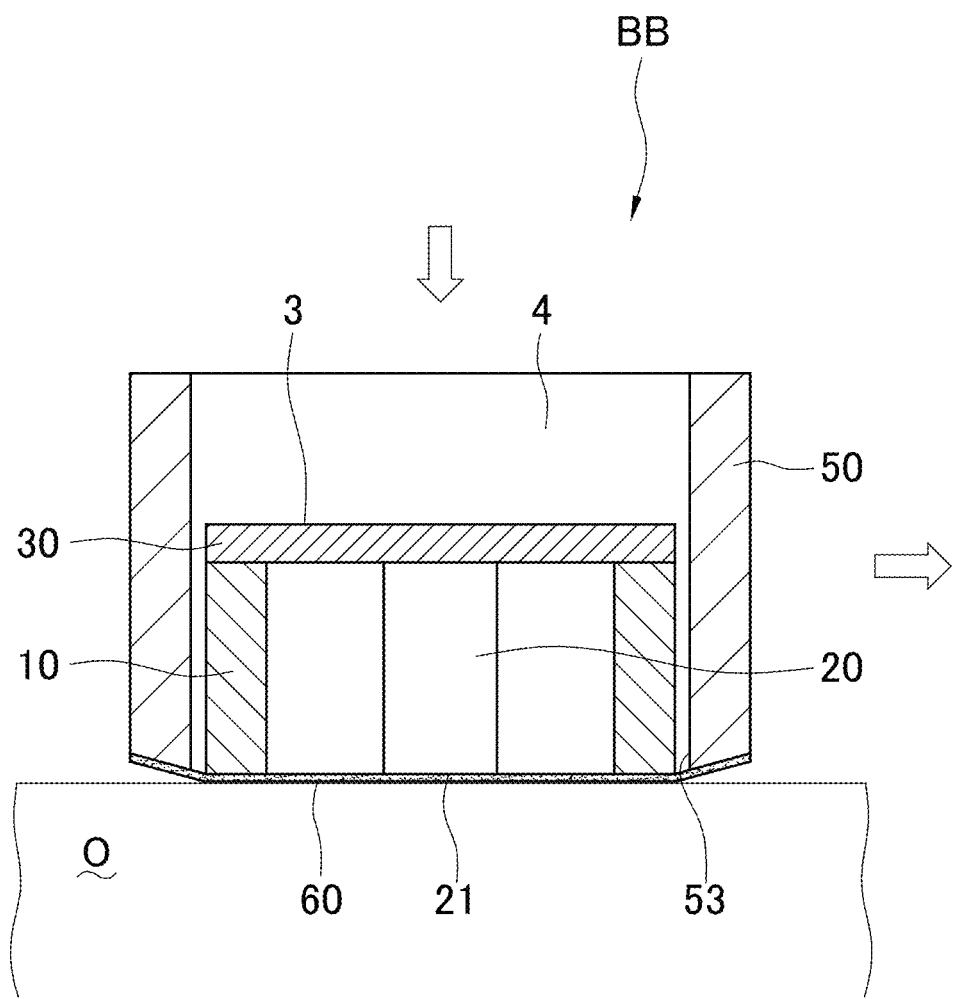
FIG. 17 is an explanatory drawing of a tactile sensation measuring method with a tactile sensor according to the second embodiment.

As illustrated in FIG. 17, in a tactile sensor BB of this embodiment, the sensor element 3 is housed in a casing 4. The casing 4 is formed of the casing main body 50 that has the opening 53 and the film 60 that closes the opening 53. In the sensor element 3, the sensing surface is in close contact with the inner surface of the film 60. The base portion 10 is secured with respect to the casing main body 50, and the contact end 21 is secured to the inner surface of the film 60.

When a tactile sensation is measured by the tactile sensor BB, the tactile sensor BB is swept while it is pressed against the measuring object O. Here, the sensing surface of the sensor element 3 is brought into contact with the measuring object O via the film 60.

When the tactile sensor BB is swept while it is pressed against the measuring object O, the contact 20 is displaced in the x-axis direction, the y-axis direction, and the z-axis direction. Based on the displacements, the surface shape and the friction force of the measuring object O can be measured.

EXAMPLES

Next, examples will be described.

A tactile sensor having a configuration similar to that of the tactile sensor AA of the first embodiment was made. A semiconductor substrate was processed to form a sensor element. A casing main body was made by a three-dimensional printer. As a film, a medical polyurethane film (thin film dressing named YU-KI PERMEROLL Lite manufactured by Nitto Denko Corporation) having a thickness of 8 µm was used.

Figure 18A:
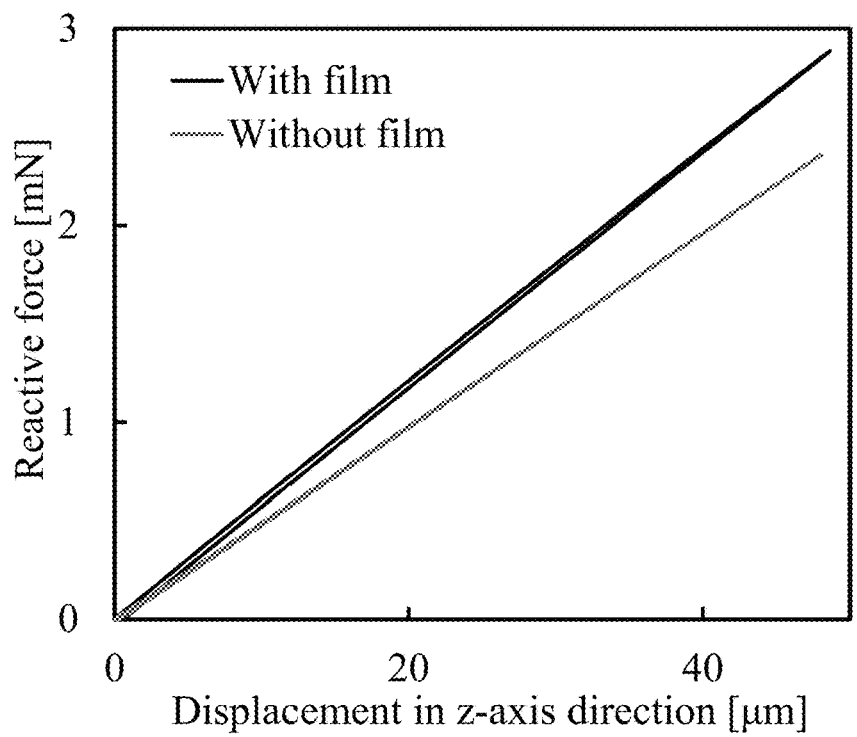
FIG. 18A is a graph illustrating a reactive force against a displacement in a z-axis direction.
Figure 18B:
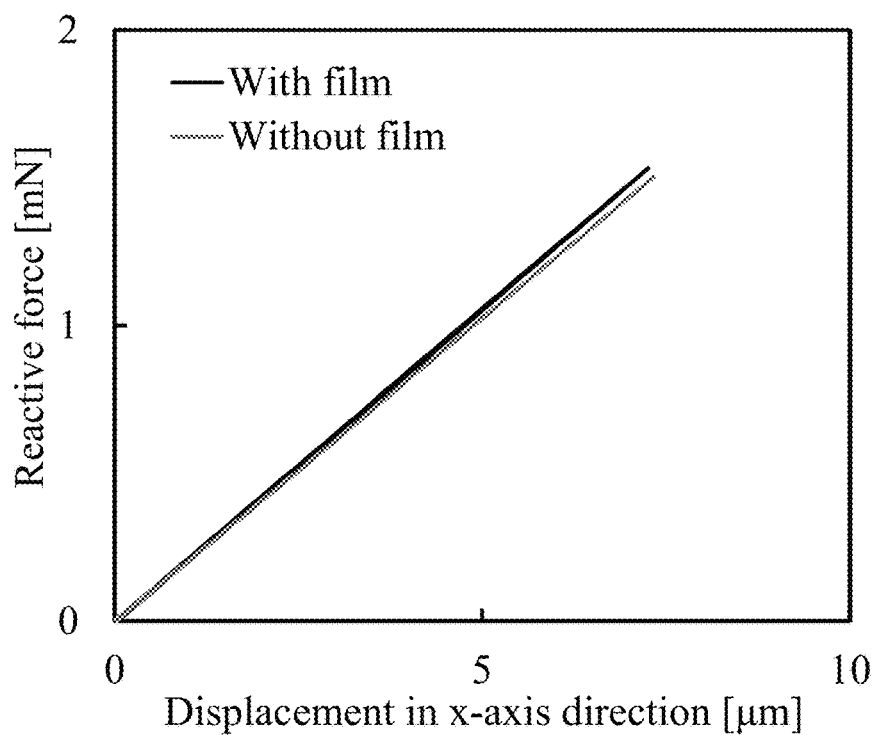
FIG. 18B is a graph illustrating a reactive force against a displacement in an x-axis direction.

In each of a case with the film and a case without the film, spring constants in the z-axis direction and the x-axis direction of a contact were measured. For measuring, a micromechanical tester (FT-MTA03 manufactured by FemtoTools) having force resolution in nN range was used. By applying a measuring probe to a distal end of the contact of the sensor element or the distal end of the contact covered with the film to precisely measure a load change (change in reactive force from a support body of the contact) when a minute displacement was continuously provided to the z-axis direction of the sensor element, the spring constant in the z-axis direction was obtained. Similarly, by continuously providing a minute displacement to the x-axis direction of the sensor element by the measuring probe to measure a load change, the spring constant in the x-axis direction was obtained. The results are illustrated in FIG. 18A and FIG. 18B. In the graph of FIG. 18A, the horizontal axis indicates the displacement in the z-axis direction of the contact, and the vertical axis indicates the reactive force of the contact. In the graph of FIG. 18B, the horizontal axis indicates the displacement in the x-axis direction of the contact, and the vertical axis indicates the reactive force of the contact.

The spring constant in the z-axis direction was 49.2 N/m in the case without the film and 59.6 N/m in the case with the film. The spring constant in the x-axis direction was 205.6 N/m in the case without the film and 212.1 N/m in the case with the film. Thus, by providing the film, the spring constant in the z-axis direction increases by 21.1%, and the spring constant in the x-axis direction increases by 3.2%. This is because the film that is in close contact with the contact has elasticity.

As the spring constant of the contact increases, a displacement of the contact with respect to an input decreases. This means that the sensitivity of a sensor element decreases at a constant rate when a film is disposed. However, from the graphs of FIG. 18A and FIG. 18B, it can be confirmed that linearity of a response can be sufficiently maintained even when the film is disposed.

Next, a tactile sensation was measured using roughness standard pieces. The roughness standard pieces used have a surface shape in which triangular ruggedness continues at a predetermined pitch. The tactile sensor was swept in a direction crossing the ruggedness to obtain measurement signals.

Figure 19:
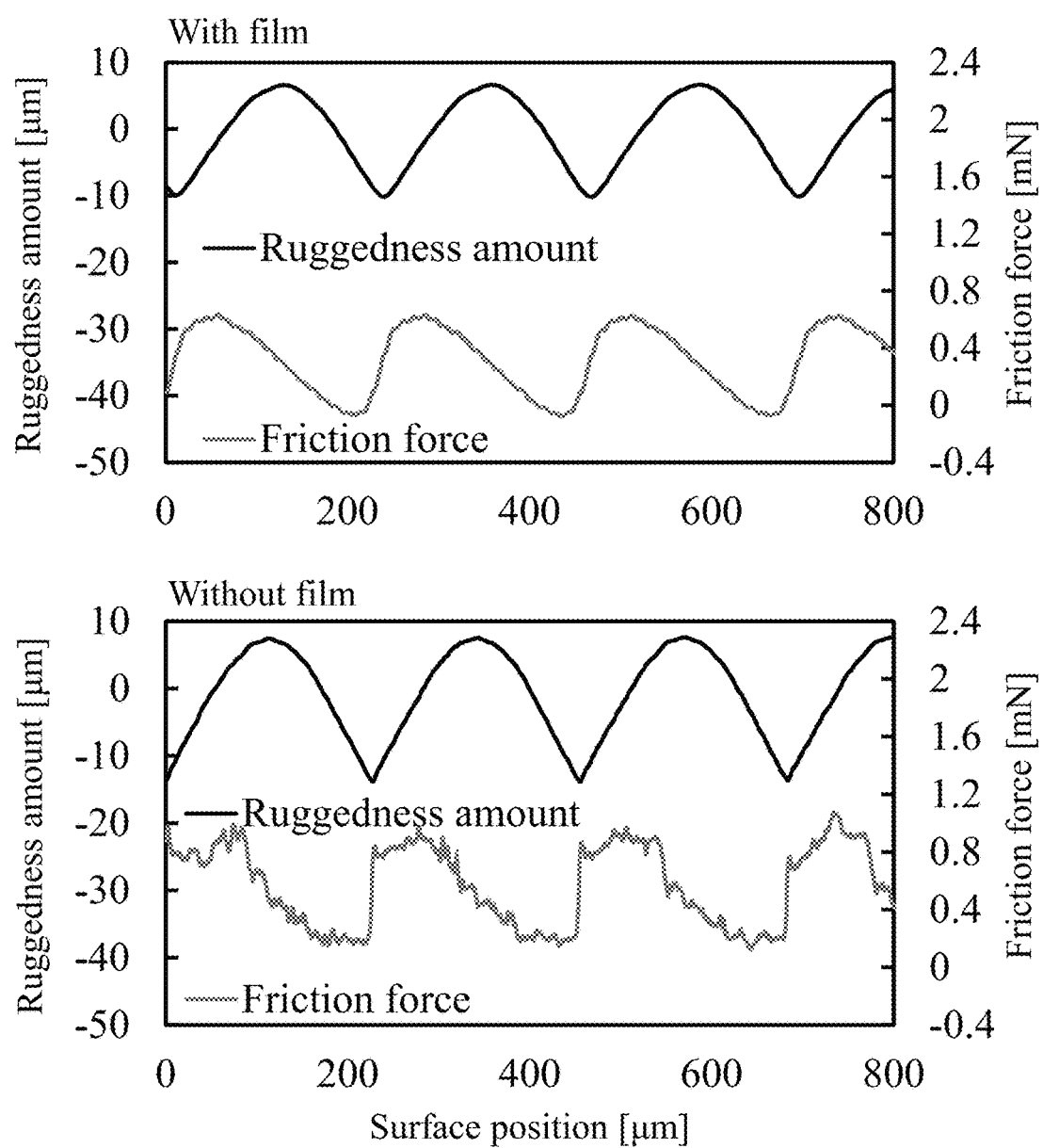
FIG. 19 illustrates graphs illustrating results of measuring a roughness standard piece with a pitch of about 250 μm.

FIG. 19 illustrates a case of measuring a roughness standard piece with a pitch of about 250 µm. An influence of the presence/absence of the film on the signal of a ruggedness amount was not confirmed. On the other hand, on the signal of a friction force, compared with the case without the film, a waveform is smooth in the case with the film. This may be because contacting of the contact against the ruggedness of the roughness standard piece is buffered by the film.

Figure 20:
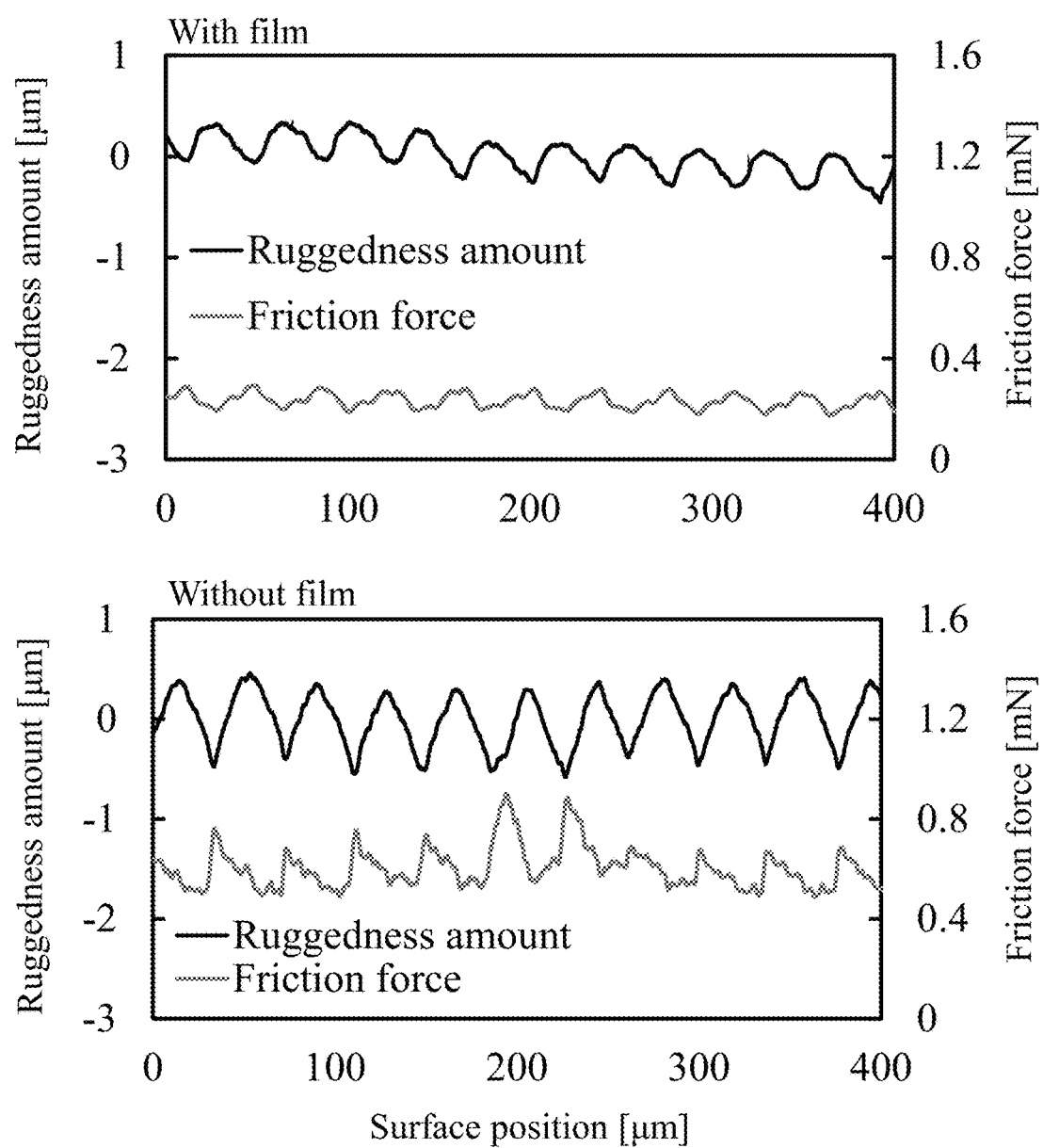
FIG. 20 illustrates graphs illustrating results of measuring a roughness standard piece with a pitch of 32 μm.

FIG. 20 illustrates a case of measuring a roughness standard piece with a pitch of 32 µm. It is confirmed that, compared with the case without the film, the amplitude of the ruggedness amount decreases in the case with the film. However, the ruggedness can be recognized. Accordingly, it was confirmed that spatial resolution of 50 µm or less could be maintained even when the film was disposed.

As described above, it can be said that mechanical characteristics of a sensor element change by providing a film. However, a film having flexibility is closer to a human skin than an end portion of a hard contact. Accordingly, it can also be considered that a tactile sensation can be measured under conditions closer to a human tactile sensation by providing a film.

Figure 21A:
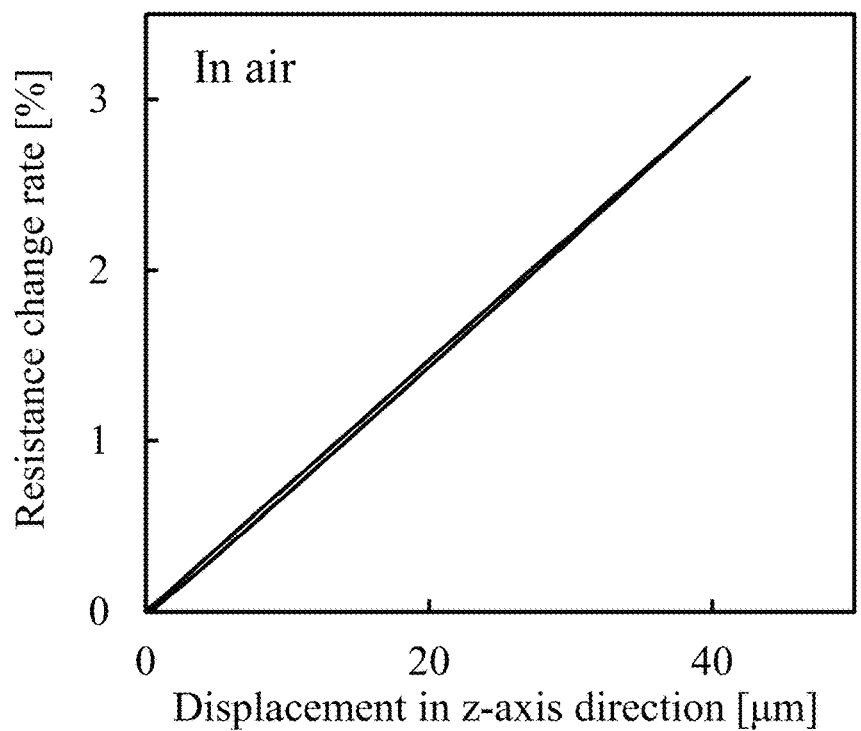
FIG. 21A is a graph of measured sensitivity in the z-axis direction in air.
Figure 21B:
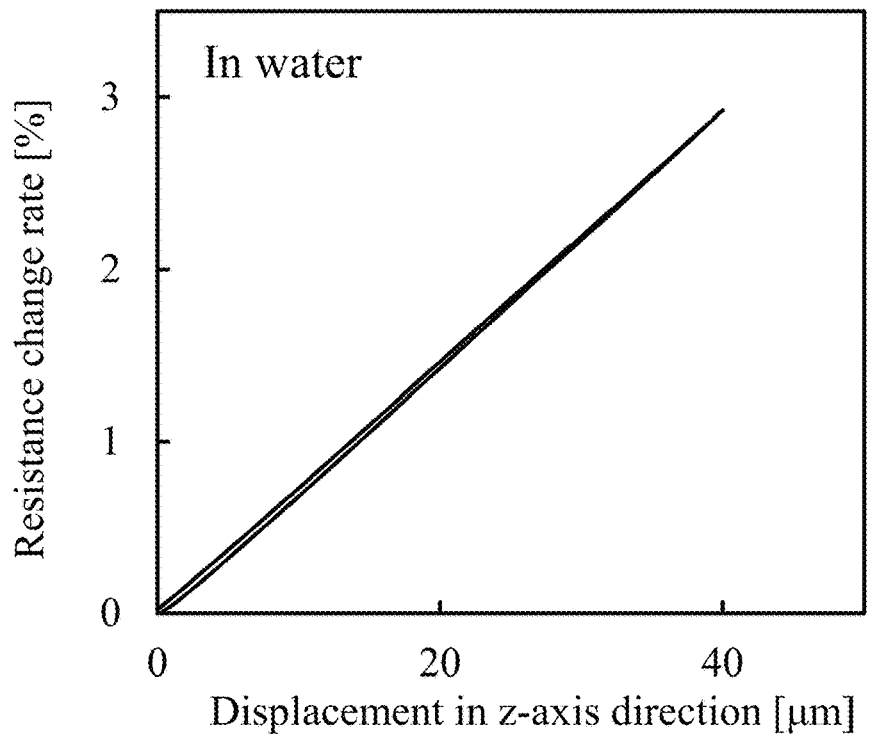
FIG. 21B is a graph of measured sensitivity in the z-axis direction in water.

Next, the sensitivity of the tactile sensor was measured in air and in water. FIG. 21A is a graph of measured sensitivity to a force in the z-axis direction received from a measuring object in air. FIG. 21B is a graph of measured sensitivity to a force in the z-axis direction received from the measuring object in water. In the graphs of FIG. 21A and FIG. 21B, the horizontal axes indicate a displacement in the z-axis direction of the contact, and the vertical axes indicate a change rate of a resistance value measured by a longitudinal displacement detector. The sensitivity was obtained from the inclination of each graph.

The sensitivity in air was 739 ppm/μm, and the sensitivity in water was 735 ppm/μm. This confirmed that there was no change in sensitivity in air or in water. Further, in the measurement in water, water did not intrude into the sensor element, and short-circuit of a detection circuit and the like did not occur.

Figure 22:
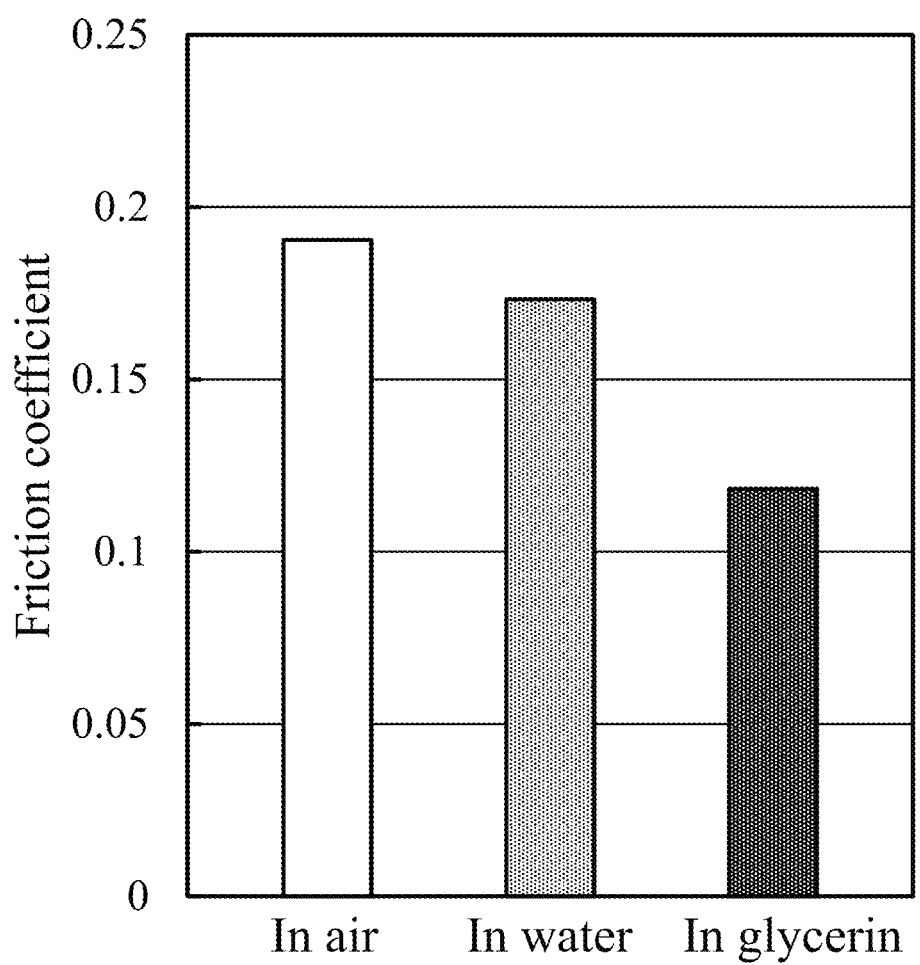
FIG. 22 is a graph illustrating friction coefficients of a glass plate measured in air, in water, and in glycerin.

Next, the tactile sensor was swept on a surface of a glass plate having a flat surface by in air, in water, and in glycerin to obtain friction coefficients. The results are illustrated in FIG. 22. From FIG. 22, it can be seen that the friction coefficient in glycerin is lower than those in other cases. This is due to the action of glycerin as a lubricant. Thus, it was confirmed that the friction force in liquid could also be measured accurately.

Next, a surface of a simulated organ used for surgery training and the like was measured by the tactile sensor. The simulated organ used contains 70% or more of water content and has fine ruggedness on the surface. Further, a simulated blood vessel that is harder than surrounding tissues is embedded in a part of the simulated organ. The tactile sensor was swept in a direction crossing the simulated blood vessel to measure the tactile sensation.

Figure 23:
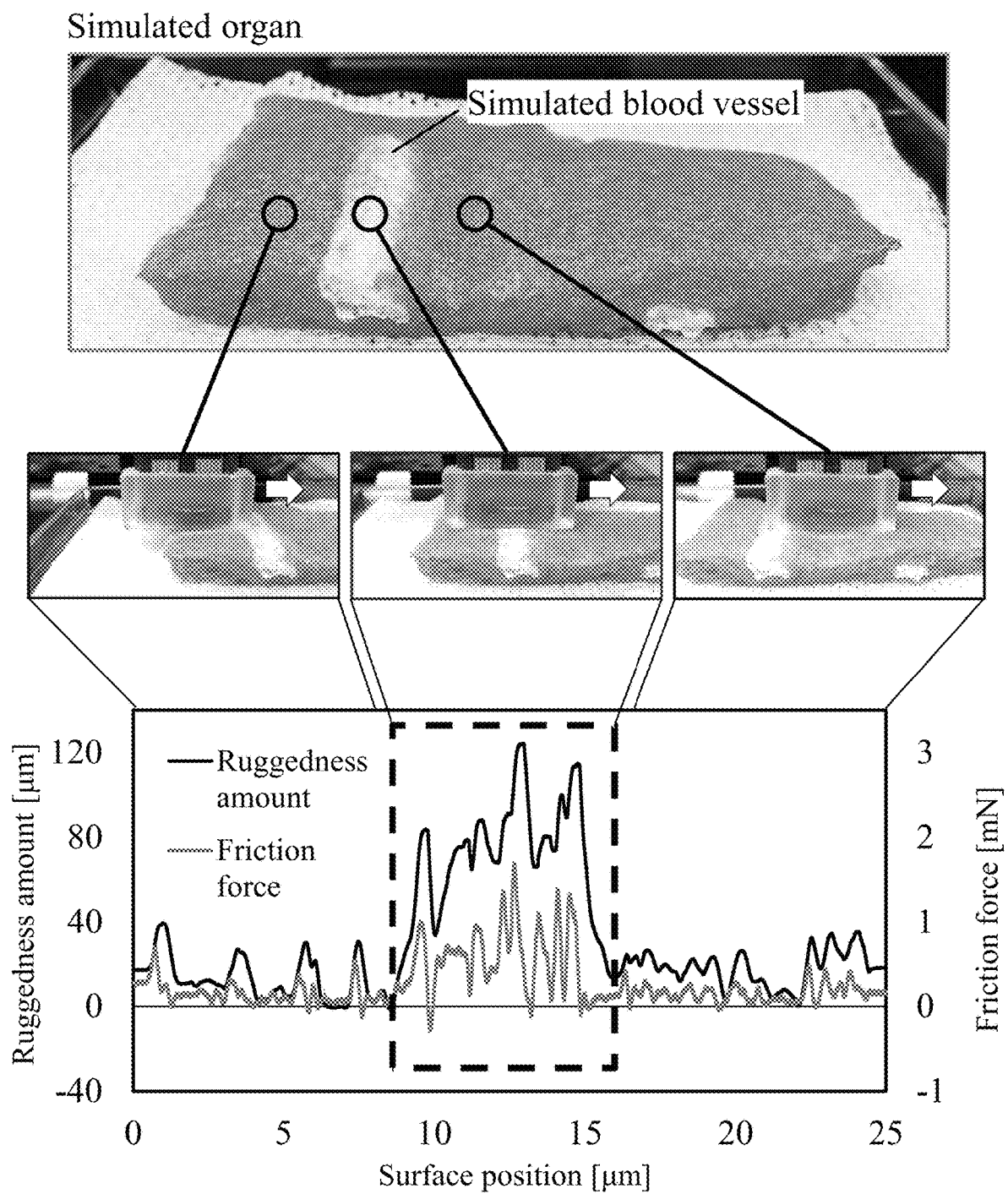
FIG. 23 is a graph illustrating a result of measuring a tactile sensation of a simulated organ.

The result is illustrated in FIG. 23. It was confirmed that the fine ruggedness and the friction force on the surface of the simulated organ could be detected with high resolution by the tactile sensor. In addition, from the waveforms of the ruggedness and the friction force, the position of the simulated blood vessel embedded in the simulated organ can be identified. This confirmed that the tactile sensor could measure the tactile sensation of a wet measuring object and could be applied to medical applications.

REFERENCE SIGNS LIST

AA, BB tactile sensor
1, 3 sensor element
2, 4 casing
10 base portion
20A to 20F contact
21 contact end
30A to 30F support body
40A to 40F displacement detector
50 casing main body
51 frame
52 exterior body
53 opening
54 attaching surface
60 film

The invention claimed is:

1. A tactile sensor comprising:
a sensor element; and
a casing that houses the sensor element, wherein
the sensor element includes
    a base portion including a reference surface to which a first axis and a second axis are parallel, the second axis perpendicular to the first axis;
    a contact extending axially along a third axis perpendicular to the first axis and the second axis, the contact having a contact end;
    a support body that supports the contact in a displaceable manner with respect to the base portion; and
    a displacement detector that detects a displacement of the contact with respect to the base portion,
the casing includes
    a film having flexibility that covers at least the contact end among the sensor element, and
    a casing main body, wherein
the casing main body includes
    a frame having an attaching surface on which an opening is formed, the film attached to the attaching surface; and
    an exterior body that covers a portion of the film other than a portion corresponding to the opening, wherein
    the portion of the film covered by the exterior body is sandwiched, in a direction of the third axis, between the frame and the exterior body,
the opening is closed by the film,
the contact end is arranged in the opening,
the contact end is secured to an inner surface of the film, and
the base portion is secured with respect to the casing main body.

2. The tactile sensor according to claim 1, wherein the film has an adhesive layer on an inner surface, and the contact end is bonded to the film by the adhesive layer.

3. The tactile sensor according to claim 1, wherein the contact end has a spike, and the spike bites into the film.

4. The tactile sensor according to claim 1, wherein the opening has a rectangular shape with end portions that are semi-elliptical or semicircular shape.

5. The tactile sensor according to claim 1, wherein the frame has an inclined surface around an outer periphery of the opening.

* * * * *